(12) United States Patent
Keilholz

(10) Patent No.: US 10,262,432 B1
(45) Date of Patent: Apr. 16, 2019

(54) SYSTEM AND METHOD FOR MEASURING AND COMPARING ITEMS USING COMPUTER VISION

(71) Applicant: Gabriel Keilholz, Jefferson City, MO (US)

(72) Inventor: Gabriel Keilholz, Jefferson City, MO (US)

( * ) Notice: Subject to any disclaimer, the term of this patent is extended or adjusted under 35 U.S.C. 154(b) by 0 days.

(21) Appl. No.: 15/859,400

(22) Filed: Dec. 30, 2017

(51) Int. Cl.
| | |
|---|---|
| *G06K 9/00* | (2006.01) |
| *G06T 7/62* | (2017.01) |
| *G06T 3/60* | (2006.01) |
| *G06T 7/90* | (2017.01) |
| *G06T 11/60* | (2006.01) |

(52) U.S. Cl.
CPC ............... *G06T 7/62* (2017.01); *G06T 3/60* (2013.01); *G06T 7/90* (2017.01); *G06T 11/60* (2013.01); *G06T 2207/30124* (2013.01); *G06T 2207/30204* (2013.01); *G06T 2210/16* (2013.01)

(58) Field of Classification Search
None
See application file for complete search history.

(56) References Cited

U.S. PATENT DOCUMENTS

| | | | |
|---|---|---|---|
| 7,522,165 B2 | 4/2009 | Weaver | |
| 7,548,794 B2 | 6/2009 | Vandergriff et al. | |
| 9,076,023 B2 | 7/2015 | de Jong | |
| 9,477,980 B2 | 10/2016 | Zagel | |
| 2003/0101105 A1 | 5/2003 | Vock | |
| 2005/0071256 A1 | 3/2005 | Singhal | |
| 2005/0234782 A1 | 10/2005 | Schackne et al. | |
| 2007/0100702 A1 | 5/2007 | Morley et al. | |
| 2011/0055054 A1* | 3/2011 | Glasson | G06Q 30/06 705/27.2 |
| 2011/0231278 A1 | 9/2011 | Fries | |
| 2014/0040041 A1 | 2/2014 | Ohnemus et al. | |
| 2014/0143096 A1* | 5/2014 | Stubert | G06T 11/00 705/26.63 |
| 2015/0248583 A1 | 9/2015 | Sugita et al. | |
| 2015/0356789 A1* | 12/2015 | Komatsu | G06T 11/60 345/633 |
| 2016/0042565 A1 | 2/2016 | Osada et al. | |
| 2016/0086031 A1* | 3/2016 | Shigeno | G06K 9/00 382/103 |
| 2016/0110595 A1 | 4/2016 | Wang et al. | |
| 2016/0243955 A1* | 8/2016 | Yoshida | B62D 15/028 |
| 2017/0004657 A1 | 1/2017 | Zagel et al. | |
| 2017/0018024 A1 | 1/2017 | Xu et al. | |
| 2017/0032526 A1* | 2/2017 | Gao | B60R 11/04 |
| 2017/0061186 A1* | 3/2017 | Laurent | G06K 9/00671 |
| 2017/0154472 A1 | 6/2017 | Selvarajan | |
| 2017/0156430 A1 | 6/2017 | Karavaev | |

* cited by examiner

*Primary Examiner* — Sean M Conner
(74) *Attorney, Agent, or Firm* — David Meibos; Maywood IP Law

(57) ABSTRACT

Systems and methods are disclosed herein that allow users to take photographs of objects from any angle and perspective and a rectification algorithm will rectify the angled photos to create scaled top-views of the objects. Rectified objects in the photographs will appear as if they were taken from directly above the object at an exact distance away from the object. Rectified and scaled photos of objects may be further segmented and/or overlaid on top of each other to enable quick visual sizing comparisons between two or more objects and/or accurate dimensional measurements between two or more objects.

20 Claims, 35 Drawing Sheets

SYSTEM AND METHOD FOR MEASURING AND COMPARING ITEMS USING COMPUTER VISION

TECHNICAL FIELD

The present disclosure relates to systems and methods for measuring and comparing two or more objects using computer vision. More specifically, the present disclosure relates to computer-implemented systems and methods that facilitate sizing comparisons between at least two items, such as two articles of clothing.

BACKGROUND

Clothing manufacturers and merchants currently use a broad range of methods to show clothing size and fit including, but not limited to: mannequins, models, manual measurements, and standard clothing sizing indications. However, each of these methods have limitations and new methods that minimized and/or eliminated these limitations would be beneficial to manufacturers, merchants, and consumers. For example, standard clothing sizing indications (S, M, L, XL, etc.) are generic and do not reflect specific dimensions sought by a consumer. Clothing sizing and measurements also vary greatly throughout the clothing industry. The process of sizing and measuring clothing is not sufficiently standardized in the clothing industry, such that clothing sizing can exhibit significant fluctuation between clothing brands. Moreover, fluctuation in clothing sizing can even occur within a single manufacturer, due to changes in clothing styles/patterns, poor quality control, poor manufacturing practices, etc. Given the wide variability among clothing sizing that currently exists, consumers are often required to personally try on each prospective article of clothing to ensure a proper fit before purchase. This process can be time consuming and frustrating for consumers and requires a physical storefront for merchants.

As online clothing sales continue to grow in popularity, a more modern and accurate method of determining clothing fit and dimensions which requires little or no extra effort from the merchant and the customer would be desirable, as it is estimated that 25% of all online clothing purchases are returned. However, a simple and effective method for determining accurate dimensions and fit of clothing online does not currently exist.

Clothing returns due to improper fit cost online merchants in many ways including, but not limited to: time costs to package items for shipment, time costs to process returned items, time costs to review and restock returned items, time costs to process refunds and/or exchanges, packaging and shipping costs, employee costs to handle returns, etc.

Systems and methods that would allow customers to provide photographic evidence to online merchants of clothing items that have shrunk, stretched, were improperly manufactured or mislabeled (e.g. mislabeled sizing), etc., can help the online merchants validate these returns and help the online merchants defer the costs of these returns to the manufacturers to incentivize the manufacturers to make appropriate production changes to fix these issues.

Clothing returns due to improper fit also cost consumers in many ways including, but not limited to: time costs to request and process a return with the online merchant, time costs to package the item to be returned, packaging and shipping costs, etc. Clothing returns also negatively impact the environment by increasing the carbon footprint of online merchants and customers by wasting resources necessary to return clothing items that do not fit.

Clothing manufacturers and online merchants can also benefit from a system that would allow them to view anonymous customer clothing data to help them verify that the dimensions of their clothing items are meeting the customer's demands. For example, customer generated clothing images and dimensions that are accessible by manufacturers and online merchants may be helpful to ensure that clothing items are sized to fit a majority of their customers, may help allow merchants to select which clothing they wish to sell, and/or allow manufacturers to identify niche clothing markets that are underserved. Customers can also benefit from a system that would allow them to accurately compare clothing sizing between clothing they already own and like and potential online clothing items. Moreover, made-to-measure/bespoke clothing manufacturers can also benefit from a system that would allow them to accurately ascertain clothing dimensions from their customers without the need for manual measurements, as manual measurements are error prone.

Systems and methods that would allow customers to quickly determine if a prospective item of clothing will likely fit them by visually inspecting the prospective item of clothing with simultaneous reference to an item of clothing of known fit, would also be desirable. Such systems and methods would provide more accurate sizing information about particular articles of clothing over traditional sizing indications/nomenclature (e.g., S, M, L, XL, etc.) currently used in the industry.

Although the present disclosure utilizes clothing sizing comparisons as the main example of illustrating the sizing comparison process between two or more objects, it will be understood that the computer vision sizing comparison concepts and program described herein may be utilized in any scenario where sizing comparisons between two or more objects may be made. Thus, example uses of the sizing comparison program and concepts that are taught in the present disclosure are virtually endless. Some additional examples of use scenarios for the sizing comparison program and concepts that are taught in the present disclosure may include, but are not limited to sizing comparisons of: shoes, hats, gloves, plates, silverware, placemats, cutlery, air filters (e.g., home, auto, small engine, etc.), pillowcases, blankets, curtains, wash cloths, towels, mobile phones, tablets, laptops, photo frames, books, paper items, shelves, rugs, wall art, clocks, mower blades, wrenches, tools, etc.

Moreover, although the present disclosure mainly describes sizing comparisons and/or measurements between two or more objects, it will be understood that that the computer vision concepts and program described herein may be utilized to make size measurements of single objects alone.

SUMMARY OF THE DISCLOSURE

The various systems and methods of the present disclosure have been developed in response to the present state of the art, and in particular, in response to the problems and needs in the art that have not yet been fully solved by currently available technology.

In some embodiments, a system for comparing one or more relative size differences between two objects using computer vision may include a display and a processor configured to receive a first image of a first angled-view of a first object spaced apart from one or more first reference markers. The processor may also be configured to receive a second image of a second object. The processor may also be configured to receive reference marker definition data including size, shape, and location information for the one or more first reference markers. The system may also include an image rectification component communicatively coupled to the processor and configured to rectify the first image by transforming the first angled-view of the first image to a rectified first top-view of the first image based on a first set of correspondences between the one or more first reference markers in the first image and the first top-view space of the first image. The system may further include an overlay component communicatively coupled to the processor and the display, the overlay component may be configured to overlay the rectified first top-view of the first image with the second image on the display to enable comparison of one or more relative size differences between the first object and the second object.

In other embodiments, a method for comparing one or more relative size differences between two objects using computer vision may include one or more processors configured to: receive a first image comprising a first angled-view of a first object spaced apart from one or more first reference markers; receive a second image comprising a second object; and receive reference marker definition data comprising size, shape, and location information for the one or more first reference markers. The method may also include calculating a first top-view space for the first image based on the reference marker definition data and rectifying the first image by transforming the first angled-view of the first image to a rectified first top-view of the first image based on a first set of correspondences between the one or more first reference markers in the first image and the first top-view space of the first image. The method may further include overlaying the rectified first top-view of the first image with the second image on the display to enable comparison of one or more relative size differences between the first object and the second object.

In yet other embodiments, a computer program product for comparing one or more relative size differences between two objects using computer vision may include one or more processors configured to perform the steps of: receiving a first image comprising a first angled-view of a first object spaced apart from one or more first reference markers; receiving a second image comprising a second object; and receiving reference marker definition data comprising size, shape, and location information for the one or more first reference markers. The computer program product may also include the step of calculating a first top-view space for the first image based on the reference marker definition data and rectifying the first image by transforming the first angled-view of the first image to a rectified first top-view of the first image based on a first set of correspondences between the one or more first reference markers in the first image and the first top-view space of the first image. The method may further include the step of overlaying the rectified first top-view of the first image with the second image on the display to enable comparison of one or more relative size differences between the first object and the second object.

These and other features and advantages of the present disclosure will become more fully apparent from the following description and appended claims, or may be learned by the practice of the disclosure as set forth hereinafter.

BRIEF DESCRIPTION OF THE DRAWINGS

Exemplary embodiments of the disclosure will become more fully apparent from the following description and appended claims, taken in conjunction with the accompanying drawings. Understanding that these drawings depict only exemplary embodiments and are, therefore, not to be considered limiting of the disclosure's scope, the exemplary embodiments of the disclosure will be described with additional specificity and detail through use of the accompanying drawings in which:

DETAILED DESCRIPTION

Exemplary embodiments of the disclosure will be best understood by reference to the drawings, wherein like parts are designated by like numerals throughout. It will be readily understood that the components of the disclosure, as generally described and illustrated in the Figures herein, could be arranged and designed in a wide variety of different configurations. Thus, the following more detailed description of the embodiments of the apparatus, system, and method, as represented in FIGS. 1 through 35, is not intended to limit the scope of the disclosure, as claimed, but is merely representative of exemplary embodiments of the disclosure.

The systems and methods described herein may allow a user to take photos of a reference board and object from nearly any angle or aspect. A rectification algorithm may rectify the photos and create views of the object such that the rectified photos appear as if they were taken from directly above the object at a standard distance away from the object. Without this rectification algorithm, the user would need to take photos from directly above the object and at an exact distance. Considering the user and manufacturer/merchant will be taking photos of various items for sizing comparisons, the different photos would likely never match in terms of angle, distance, or position of the camera relative to the object. The systems and methods described herein allow photos to be taken from any angle, distance, and position relative to the object and rectified photos will always be corrected to a scaled "top-view" of the object.

Figure 1:
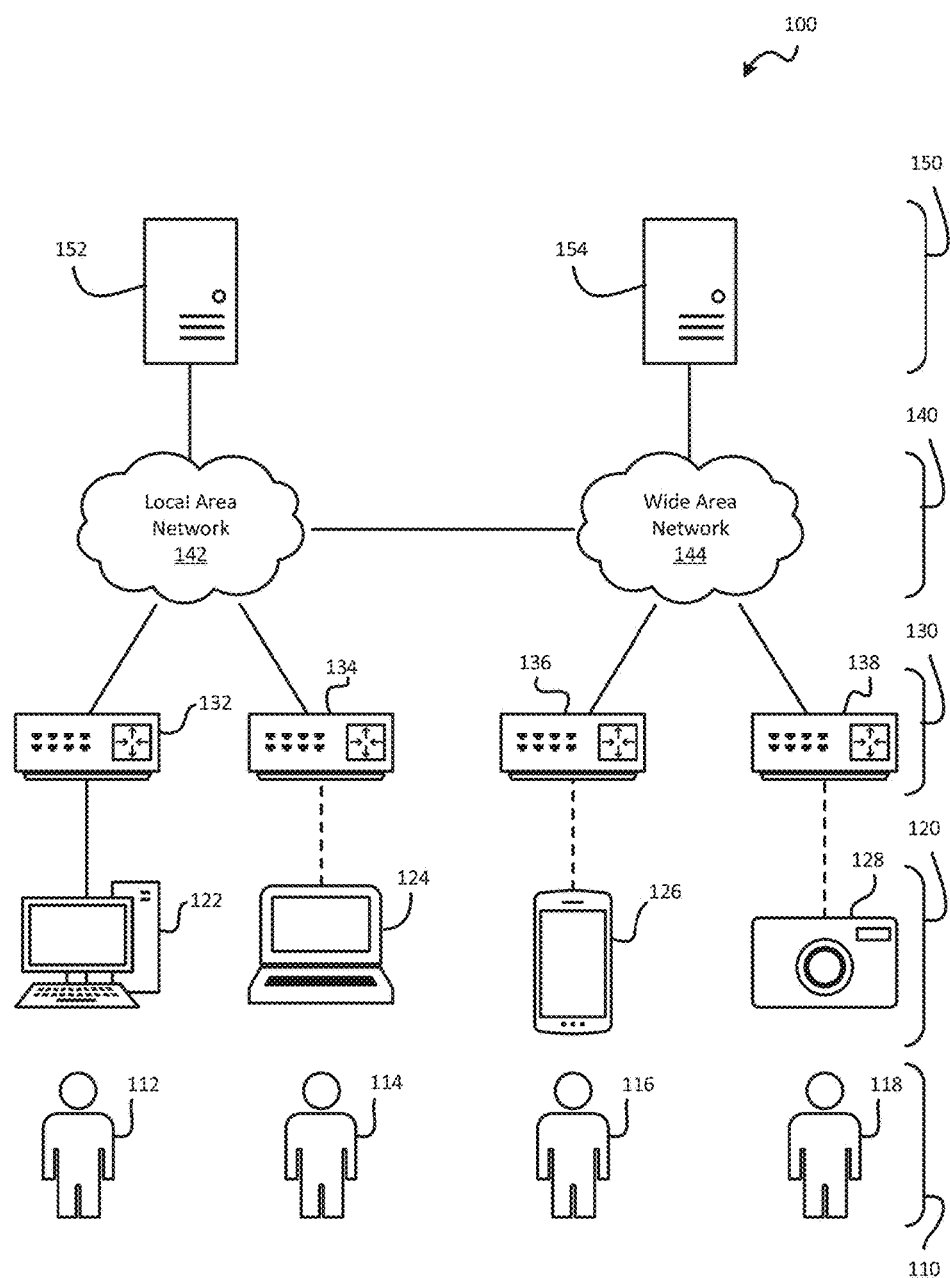
FIG. 1 is a schematic block diagram illustrating a system, according to one embodiment of the disclosure.

Referring now to FIG. 1, a schematic block diagram illustrates a system 100 according to one embodiment of the disclosure. The system 100 may be used for the benefit of one or more users 110, which may include a first user 112, a second user 114, a third user 116, and a fourth user 118 as shown in FIG. 1. Each of the users 110 may use one of a variety of computing devices 120, which may include any of a wide variety of devices that carry out computational steps, including but not limited to a desktop computer 122 used by the first user 112, a laptop computer 124 used by the second user 114, a smartphone 126 used by the third user 116, a camera 128 used by the fourth user 118, and the like. The systems and method presented herein may be carried out on any type of computing device.

The computing devices 120 may optionally be connected to each other and/or other resources. Such connections may be wired or wireless, and may be implemented through the use of any known wired or wireless communication standard, including but not limited to Ethernet, 802.11a, 802.11b, 802.11g, and 802.11n, 802.11ac, etc., universal serial bus (USB), Bluetooth, cellular, near-field communications (NFC), Bluetooth Smart, ZigBee, and the like. In FIG. 1, by way of example, wired communications are shown with solid lines and wireless communications are shown with dashed lines.

Communications between the various elements of FIG. 1 may be routed and/or otherwise facilitated through the use of routers 130. The routers 130 may be of any type known in the art, and may be designed for wired and/or wireless communications through any known communications standard including but not limited to those listed above. The routers 130 may include, for example, a first router 132 that facilitates communications to and/or from the desktop computer 122, a second router 134 that facilitates communications to and/or from the laptop computer 124, a third router 136 that facilitates communications to and/or from the smartphone 126, and a fourth router 138 that facilitates communications to and/or from the camera 128.

The routers 130 may facilitate communications between the computing devices 120 and one or more networks 140, which may include any type of networks including but not limited to local area networks such as a local area network 142, and wide area networks such as a wide area network 144. In one example, the local area network 142 may be a network that services an entity such as an individual, residence, business, non-profit entity, government organization, or the like. The wide area network 144 may provide communications for multiple entities and/or individuals, and in some embodiments, may be the Internet. The local area network 142 may communicate with the wide area network 144. If desired, one or more routers or other devices may be used to facilitate such communication.

The networks 140 may store information on servers 150 or other information storage devices. As shown, a first server 152 may be connected to the local area network 142, and may thus communicate with devices connected to the local area network 142 such as the desktop computer 122 and the laptop computer 124. A second server 154 may be connected to the wide area network 144, and may thus communicate with devices connected to the wide area network 144, such as the smartphone 126 and the camera 128. If desired, the second server 154 may be a web server that provides web pages, web-connected services, executable code designed to operate over the Internet, and/or other functionality that facilitates the provision of information and/or services over the wide area network 144.

Figure 2A:
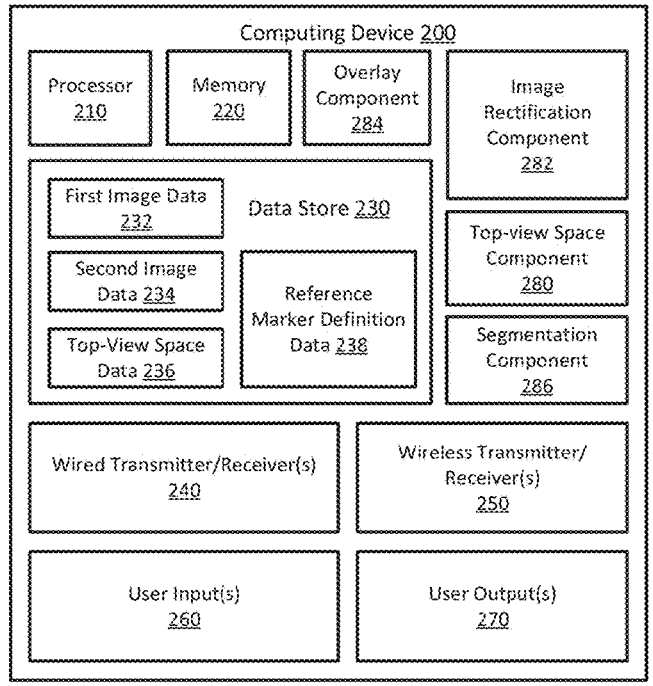
FIG. 2A is a schematic block diagram illustrating a computing device which is capable of practicing the disclosure in a standalone computing environment, according to one embodiment of the disclosure.

Referring to FIG. 2A, a schematic block diagram illustrates an exemplary computing device 200. The exemplary computing device 200 may be any suitable computing device, such as the computing devices 120 shown in FIG. 1, or any other computing device that may enable implementation of the disclosure in a standalone computing environment.

As shown, the computing device 200 may include a processor 210 that is designed to execute instructions on data. The processor 210 may be of any of a wide variety of types, including microprocessors with x86-based architecture or other architecture known in the art, application-specific integrated circuits (ASICs), field-programmable gate arrays (FPGA's), and the like. The processor 210 may optionally include multiple processing elements, or "cores."

The processor 210 may include a cache that provides temporary storage of data incident to the operation of the processor 210.

The computing device 200 may further include memory 220, which may be volatile memory such as random access memory (RAM). The memory 220 may include one or more memory modules. The memory 220 may include executable instructions, data referenced by such executable instructions, and/or any other data that may beneficially be made readily accessible to the processor 210.

The computing device 200 may further include one or more wired transmitter/receivers 240, which may facilitate wired communications between the computing device 200 and any other device, such as the other computing devices 120, the servers 150, and/or the routers 130 of FIG. 1. The wired transmitter/receivers 240 may communicate via any known wired protocol, including but not limited to any of the wired protocols described in FIG. 1. In some embodiments, the wired transmitter/receivers 240 may include Ethernet adapters, universal serial bus (USB) adapters, and/or the like.

The computing device 200 may further include one or more wireless transmitter/receivers 250, which may facilitate wireless communications between the computing device 200 and any other device, such as the other computing devices 120, the servers 150, and/or the routers 130 of FIG. 1. The wireless transmitter/receivers 250 may communicate via any known wireless protocol, including but not limited to any of the wireless protocols described in FIG. 1. In some embodiments, the wireless transmitter/receivers 250 may include Wi-Fi adapters, Bluetooth adapters, cellular adapters, and/or the like.

The computing device 200 may further include one or more user inputs 260 that receive input from a user. The user inputs 260 may be integrated into the computing device 200, or may be separate from the computing device 200 and connected to it by a wired or wireless connection, which may operate via the wired transmitter/receivers 240 and/or the wireless transmitter/receivers 250. The user inputs 260 may include elements such as a touch screen, buttons, keyboard, mouse, trackball, track pad, stylus, digitizer, digital camera, microphone, and/or other user input devices known in the art.

The computing device 200 may further include one or more user outputs 270 that provide output to a user. The user outputs 270 may be integrated into the computing device 200, or may be separate from the computing device 200 and connected to it by a wired or wireless connection, which may operate via the wired transmitter/receivers 240 and/or the wireless transmitter/receivers 250. The user outputs 270 may include elements such as a display, display screen, speaker, vibration device, LED or other lights, and/or other output devices known in the art. In some embodiments, one or more of the user inputs 260 may be combined with one or more of the user outputs 270, as may be the case with a touch screen.

The computing device 200 may further include a data store 230, which may be non-volatile memory such as a hard drive, flash memory, and/or the like. The data store 230 may include one or more data storage elements. The data store 230 may store executable code such as an operating system and/or various programs to be run on the computing device 200. The data store 230 may further store data to be used by such programs. For the systems and methods of the present disclosure, the data store 230 may store first image data 232, second image data 234, top-view space data 236, and/or reference marker definition data 238.

The first image data 232 may include digital data representative of a first image. For example, the first image may be a picture (that may have been taken from an angled-view) of a first object, such as an item of clothing that is spaced apart from one or more reference markers. The first image data 232 may also include digital data representative of the first image which has undergone one or more image processing techniques. For example, the first image data 232 may include digital data representative of rectified, scaled, and/or segmented top-view images of the first object that have been derived from the first image.

Likewise, the second image data 234 may include digital data representative of a second image. For example, the second image may be a picture (that may also have been taken from an angled-view) of a second object, such as an item of clothing that is spaced apart from one or more reference markers. The second image data 234 may also include digital data representative of the second image that has undergone one or more image processing techniques. For example, the second image data 234 may include digital data representative of rectified, scaled, and/or segmented top-view images of the second object that have been derived from the second image.

The top-view space data 236 may include data relating to the rectification process of digital images described. For example, methods described herein may utilize one or more reference board definition files, as will be described in more detail below with reference to FIGS. 9-16B. Essentially, a reference board definition file may contain reference marker definition data 238 comprising a list of relevant characteristics for all reference markers associated with a particular reference board (e.g., each reference marker's location, dimensions, shapes, patterns, orientations, etc.). In a particular embodiment, the one or more reference markers may comprise one or more ArUco markers. An ArUco marker is a synthetic square marker that has a black border and an inner binary matrix pattern comprising various white and black squares, the pattern of which determines an ArUco marker's unique identifier (ID). The black border of the ArUco marker may help facilitate faster detection of the ArUco marker in a digital image. The binary codification of the ArUco marker may also help facilitate its identification in a digital image, as well as allow for the application of error detection and correction techniques. The size of an ArUco marker can determine the size of its internal binary matrix. As an example, an ArUco marker with an internal binary matrix size of 4×4 is composed of 16 bits. The size of the ArUco markers relative to the size of the background may affect measurement accuracy. For example smaller ArUco markers may still be detected, but the accuracy of measurement may be reduced. The number of ArUco markers may also help with measurement accuracy, as well as adjusting the image for rotation and angle during rectification of images to a "top-view" perspective.

Although ArUco markers are used to describe the main embodiment examples disclosed herein, it will be understood that any style of optical reference markers may also be used with embodiments disclosed herein without departing from the spirit or scope of the present disclosure.

The top-view space data 236 may be derived from information contained in a given reference board definition file. For example, the top-view space component 280 may be used to calculate top-view space data 236 by utilizing the information of theoretical reference markers contained in the reference board definition file to compute the locations of all corners of each reference marker described in the reference board definition file, as if the reference markers were laid on a theoretical image with a fixed height. In one example, the theoretical image height may be selected to be, for example, 2000 pixels and the pixel size may be computed to be the distance between the topmost and lowest corners divided by 2000. The image width may also be adjusted accordingly, keeping the pixel size and/or aspect ratio square in shape. The data describing the set of markers' locations may be called the top-view space for a given reference board. Furthermore, means for entering a correction factor may also be provided to more accurately compute the dimensions of the top-view space when the dimensions and/or other characteristics of actual reference markers differ somewhat from their theoretical reference marker counterparts.

The image rectification component 282 may effectuate a rectification process by processing an image using ArUco algorithms to find the locations of all corner points for each detected ArUco marker visible in the image. A set of correspondences may then be established between each of the detected ArUco markers' corners and the corners on the top-view space that was generated by the top-view space component 280, as described above. This set of point-to-point correspondences may then be used to compute a homography between an image that contains an object and a reference board where the image has been taken at an angled-view, not a top-view, and the top-view space calculated by the top-view space component 280 described above based on the reference board definition file corresponding to the actual reference board that is shown in the image. This homography between the image and its related top-view space may then be used to compute a rectified top-view image of the original image using the set of point-to-point correspondences between the original image and its corresponding rectified top-view image. In this manner, the homography essentially "warps", "translates", "morphs", and/or "transforms", the original image into its top-view space producing a rectified top-view of the image. Thus, the rectified top-view of the image shows a top-view version of the object from the original image as if the user had taken the photograph directly over the object. Furthermore, as the pixel size and/or aspect ratio is known and scaled to a selected scale during the rectification process, the object in the rectified image is also scaled to the selected scale. The object in the rectified top-view image may therefore be directly overlaid on top of other objects that have undergone a similar rectification process with matching scales, and relative sizing comparisons can then be made between the two overlaid objects. Moreover, this rectification and scaling process also allows users to make accurate measurements on either, or both, of the overlaid rectified images directly without the need for any further scaling.

In summary, the rectification process described above allows the user to stand at any angle with respect to the reference board/object, as well as any orientation (e.g., either side of the reference board, top/bottom of the reference board, etc.), while taking a photograph. The rectification process will then rectify the image to provide a top-view of the reference board/object, as though the user was standing directly above the reference board/object when taking the picture. The rectification process also scales the rectified image using the known size and shapes of the reference markers to allow rectified objects to be accurately measured using photogrammetry techniques.

Once the rectification process has been completed, the overlay component 284 may overlay a rectified top-view of a first image with a rectified top-view of a second image on a display (not shown) in order to enable comparison of one or more relative size differences between a first object and a second object.

The segmentation component 286 may also be used to further segment an object in a rectified image from its background in the rectified image, in order to eliminate the background from the rectified image and help facilitate visual sizing comparisons between segmented objects and also help facilitate direct measurements on segmented objects. However, it will be understood that segmentation of objects from their backgrounds is not required and full images that include backgrounds may be viewed and compared with other images using, for example, opacity techniques, as will be discussed in more detail below. Segmentation may be implemented automatically by the segmentation component 286 or manually selected by the user. There are various techniques for segmenting objects in images from their backgrounds. Example segmentation techniques include, but are not limited to: edge detection segmentation, GrabCut segmentation, matting segmentation, classification segmentation, and the like. These segmentation techniques will be explained in greater detail with reference to FIGS. 6 and 7.

The computing device 200 may also include various other components not shown or described herein. Those of skill in the art will recognize, with the aid of the present disclosure, that any such components may be used to carry out the present disclosure, in addition to or in the alternative to the components shown and described in connection with FIG. 2A.

The computing device 200 may be capable of carrying out the present disclosure in a standalone computing environment, i.e., without relying on communication with other devices such as the other computing devices 120 or the servers 150. In other embodiments, the present disclosure may be utilized in different computing environments. One example of a client/server environment will be shown and described in connection with FIG. 2B.

Figure 2B:
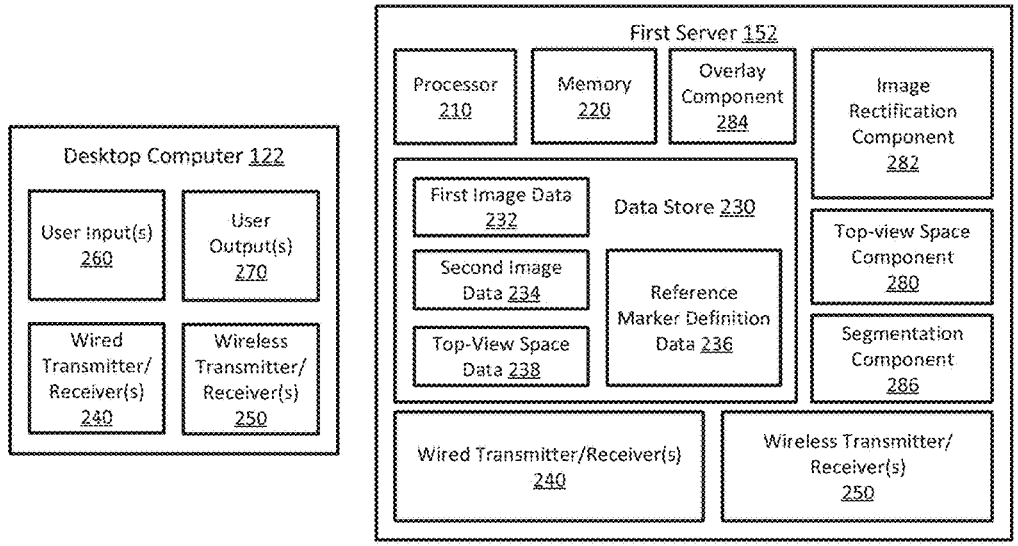
FIG. 2B is a schematic block diagram illustrating the desktop computer of FIG. 1, and a server in the form of the first server of FIG. 1, which may cooperate to enable practice of the disclosure with client/server architecture, according to one embodiment of the disclosure.

Referring to FIG. 2B, a schematic block diagram illustrates a computing device in the form of the desktop computer 122 of FIG. 1, and a server in the form of the first server 152 of FIG. 1, which may cooperate to enable practice of the disclosure with client/server architecture. As shown, the desktop computer 122 may be a "dumb terminal," made to function in conjunction with the first server 152.

Thus, the desktop computer 122 may have only the hardware needed to interface with a user (such as the first user 112 of FIG. 1) and communicate with the first server 152. Thus, the desktop computer 122 may include one or more user inputs 260, one or more user outputs 270, one or more wired transmitter/receivers 240, and/or one or more wireless transmitter/receivers 250. These components may be as described in connection with FIG. 2A.

Computing functions (apart from those incident to receiving input from the user and delivering output to the user) may be carried out in the first server 152. Thus, the processor 210, memory 220, data store 230, wired transmitter/receivers 240, and wireless transmitter/receivers 250 may be housed in the first server 152. These components may also be as described in connection with FIG. 1.

In operation, the desktop computer 122 may receive input from the user via the user inputs 260. The user input may be delivered to the first server 152 via the wired transmitter/receivers 240 and/or wireless transmitter/receivers 250. This user input may be further conveyed by any intervening devices, such as the first router 132 and any other devices in the local area network 142 that are needed to convey the user input from the first router 132 to the first server 152.

The first server 152 may conduct any processing steps needed in response to receipt of the user input. Then, the first server 152 may transmit user output to the user via the wired transmitter/receivers 240, and/or wireless transmitter/receivers 250. This user output may be further conveyed by any intervening devices, such as the first router 132 and any other devices in the local area network 142 that are needed to convey the user output from the first server 152 to the first router 132. The user output may then be provided to the user via the user outputs 270.

Figure 3:
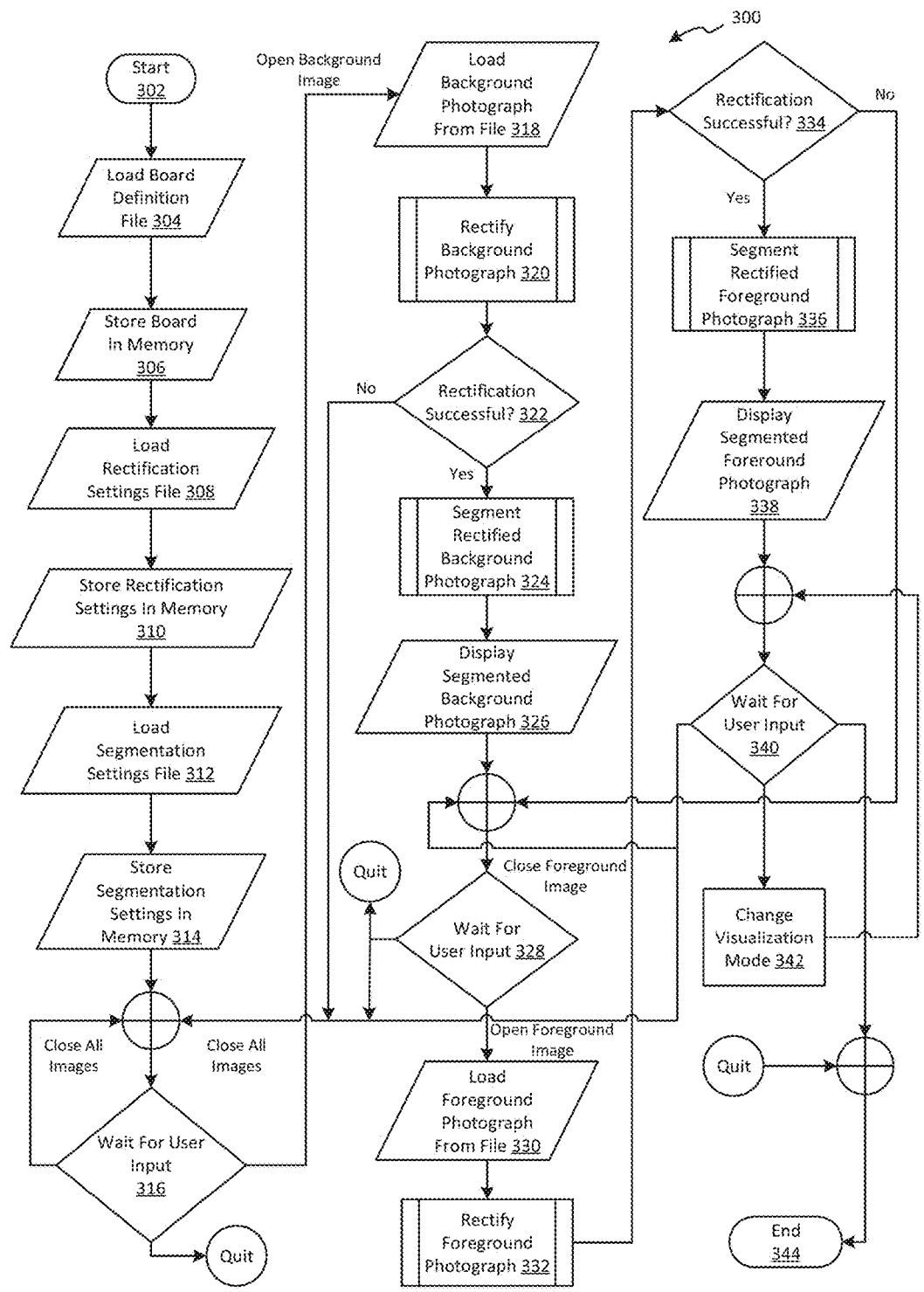
FIG. 3 is a flowchart diagram illustrating a method of preparing and displaying photographs of objects for sizing comparisons using computer vision, according to one embodiment of the disclosure.

Referring to FIG. 3, a flowchart diagram illustrates a method 300 of preparing and displaying photographs of objects for sizing comparisons using computer vision, according to one embodiment of the present disclosure. The method 300 may be carried out through the use of any of the components of the system 100 of FIGS. 1-2B. Alternatively, the method 300 may be carried out with hardware different from that of the system 100 of FIGS. 1-2B.

The method 300 may start 302 with a step 304 in which a reference board definition file may be loaded into a suitable computing device and/or stored in the memory of the computing device in a step 306. The board definition file may contain reference marker definition data 238, including a list of relevant characteristics for all reference markers associated with a particular reference board (e.g., each reference marker's location, dimensions, shapes, patterns, orientations, etc.).

Once the board definition file has been loaded and stored, the method 300 may proceed to steps 308 and 310 in which a rectification settings file may be loaded into the computing device and/or stored in the memory of the computing device. The rectification settings file may include top-view space data 236 and/or data relating to the rectification process of digital images, as described herein. The top-view space data 236 may also be derived from the information that is contained in the reference board definition file.

Once the rectification settings file has been loaded and stored, the method 300 may proceed to steps 312 and 314 in which a segmentation settings file may be loaded into the computing device and/or stored in the memory of the computing device. The segmentation settings file may include segmentation data relating to one or more segmentation processes for digital images, as will be described in more detail with reference to FIGS. 6 and 7.

Once the segmentation settings file has been loaded and stored the method 300 may proceed to a step 316 in which the method may wait for additional user input. In the step 316, the user has the option of quitting the method and/or closing any/all open images to remain in the step 316. The user may also select and open a background image, in which case the method may proceed to a step 318.

In the step 318, the selected background photograph may be loaded from a file into the computing device and/or stored in the memory of the computing device. Once the selected background photograph has been loaded from the file into the computing device and/or stored in the memory of the computing device, the method 300 may then proceed to a step 320.

In the step 320, the background photograph may be rectified using techniques previously described herein with reference to FIG. 2A, transforming the background photograph into a rectified and/or scaled top-view image version of the background photograph.

Once the background photograph has been rectified, the method may proceed to a step 322 in which it may be determined whether or not the rectification process was successful. This determination may be accomplished by visual inspection of the rectified version of the background photograph by the user and/or by suitable image processing techniques that may automatically determine if the rectification process was successful. If it is determined that the rectification process was not successful, the image may be closed and the method may proceed to the step 316 where the method 300 may wait for additional user input as previously discussed. However, if it is determined that the rectification process was successful, the method 300 may proceed to a step 324.

In the step 324, the rectified background photograph may be segmented to isolate the object in the rectified background photograph from any background in the rectified background photograph. The different ways of effecting this segmentation process will be discussed in more detail with reference to FIGS. 6 and 7.

Once the rectified background photograph has been segmented, the method 300 may proceed to a step 326 in which the segmented background photograph may be displayed on a display (not shown), and the method 300 may then proceed to a step 328.

In the step 328, the method 300 may wait for additional user input. In the step 328, the user has the option of quitting the method and/or closing any/all open background images to return to the step 316. The user may also select and open a foreground image, in which case the method may proceed to a step 330.

In the step 330, the selected foreground photograph may be loaded from a file into the computing device and/or stored in the memory of the computing device. Once the selected foreground photograph has been loaded from the file into the computing device and/or stored in the memory of the computing device, the method 300 may proceed to a step 332.

In the step 332, the foreground photograph may be rectified using techniques previously described herein with reference to FIG. 2A in order to transform the foreground photograph into a rectified and/or scaled top-view image version of the foreground photograph.

Once the foreground photograph has been rectified, the method may proceed to a step 334 in which it may be determined whether or not the rectification process was successful. This determination may be accomplished by visual inspection of the rectified version of the foreground photograph by the user and/or by suitable image processing techniques that may automatically determine if the rectification process was successful. If it is determined that the rectification process was not successful, the image may be closed and the method may proceed to the step 328 where the method 300 may wait for additional user input as previously discussed. However, if it is determined that the rectification process was successful, the method 300 may proceed to a step 336.

In the step 336, the rectified foreground photograph may be segmented to isolate the object in the rectified foreground photograph from any background in the rectified foreground photograph. The different ways of effecting this segmentation process will be discussed in more detail with reference to FIGS. 6 and 7.

Once the rectified foreground photograph has been segmented, the method 300 may proceed to a step 338 in which the segmented foreground photograph may be displayed, overlaying the foreground photograph with the background photograph on the display, and the method 300 may proceed to a step 340.

In the step 340, the method 300 may wait for additional user input. In the step 340, the user has the option of quitting the method and/or closing any/all open images to return to the step 316. In a step 342, the user may also change various visualization modes and parameters of the displayed overlaid images that are displayed to extract sizing or measurement information from the overlaid images, as will be discussed with reference to FIGS. 17-35. Once the user has extracted the desired information from the overlaid images, the user may quit the method 300, and the method 300 may end 344.

The method 300, and all other methods disclosed herein, may be implemented in a wide variety of ways. Although the various steps of the methods disclosed herein are shown and described in a certain order, those of skill in the art will recognize that the steps of the methods disclosed herein may be executed in many different order combinations from those set forth in the descriptions of their corresponding Figures. Furthermore, some of the steps of the methods disclosed herein are optional and may be omitted and/or replaced with other steps not specifically described herein.

Figure 4:
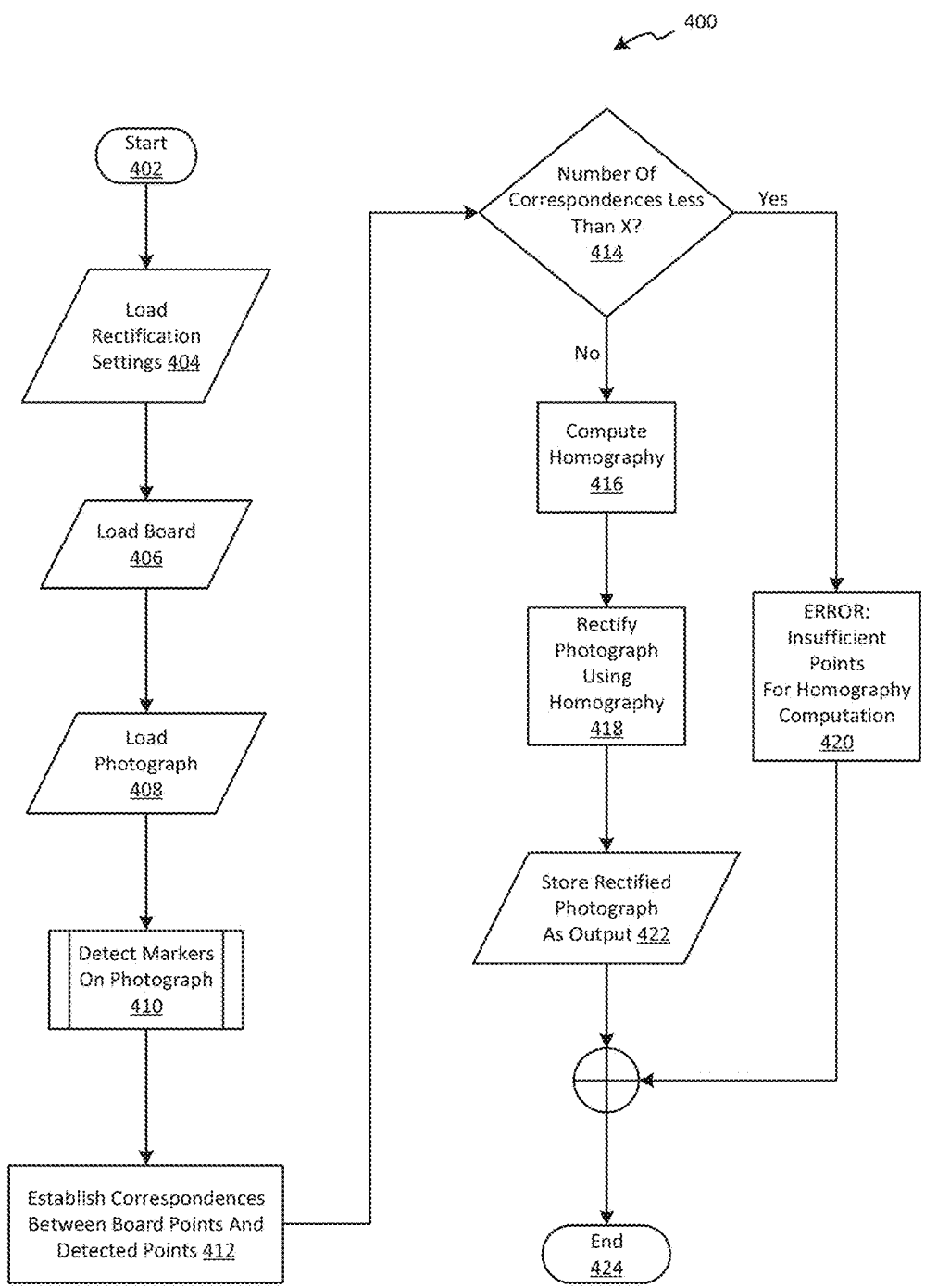
FIG. 4 is a flowchart diagram illustrating a method of rectifying a photograph of an object placed on a single reference board, according to one embodiment of the disclosure.

Referring to FIG. 4, a flowchart diagram illustrates a method 400 of rectifying a photograph of an object placed on a single reference board, according to one embodiment of the present disclosure. The method 400 may be carried out through the use of any of the components of the system 100 of FIGS. 1-2B. Alternatively, the method 400 may be carried out with hardware different from that of the system 100 of FIGS. 1-2B.

The method 400 may start 402 with a step 404 in which rectification settings may be loaded into a suitable computing device. The rectification settings may include top-view space data 236 and/or data relating to the rectification process of digital images, as described herein. The top-view space data 236 may also be derived from information contained in a suitable reference board definition file, as previously discussed.

Once the rectification settings have been loaded in the computing device, the method 400 may proceed to a step 406 in which reference board information for a single reference board may be loaded into the computing device. The reference board information may contain reference marker definition data 238, including a list of relevant characteristics for all reference markers associated with a particular single reference board (e.g., each reference marker's location, dimensions, shapes, patterns, orientations, etc.).

Once the reference board information has been loaded into the suitable computing device, the method 400 may proceed to a step 408 in which a photograph may be loaded into the computing device.

Once the photograph has been loaded into the computing device, the method 400 may proceed to a step 410 in which image processing techniques may be used to detect one or more reference markers on the single reference board in the photograph.

Once the one or more reference markers on the single reference board in the photograph have been detected, the method 400 may proceed to a step 412 in which one or more correspondences may be established between points on theoretical reference markers associated with a theoretical reference board and points on actual reference markers associated with single reference board that is shown in the photograph.

Once the one or more correspondences have been established, the method 400 may proceed to a step 414 in which it may be determined whether or not the number of correspondences established in step 412 is less than a predetermined amount "X" (e.g., X can be chosen to be four, as one non-limiting example). If the number of correspondences established in step 412 is less than the predetermined amount, the method 400 may proceed to a step 420 in which an error message may be displayed stating: "ERROR: Insufficient points for homography computation", after which the method 400 may end 424. However, if the number of correspondences established in step 412 is not less than the predetermined amount, the method 400 may proceed to a step 416.

In the step 416, a homography may be computed between the photograph and its related top-view space, as defined by actual reference markers in the photograph and corresponding theoretical reference markers in the reference board information, as previously described above with reference to the image rectification component 282 shown in FIG. 2A.

Once the homography has been computed between the photograph and its related top-view space, the method 400 may proceed to a step 418 in which the photograph may be rectified using the computed homography obtained in step 416.

Once the photograph has been rectified using the computed homography obtained in step 416, in a step 422, the rectified photograph may be stored and/or made available for use as an output photograph for display, after which the method 400 may end 424.

Figure 5:
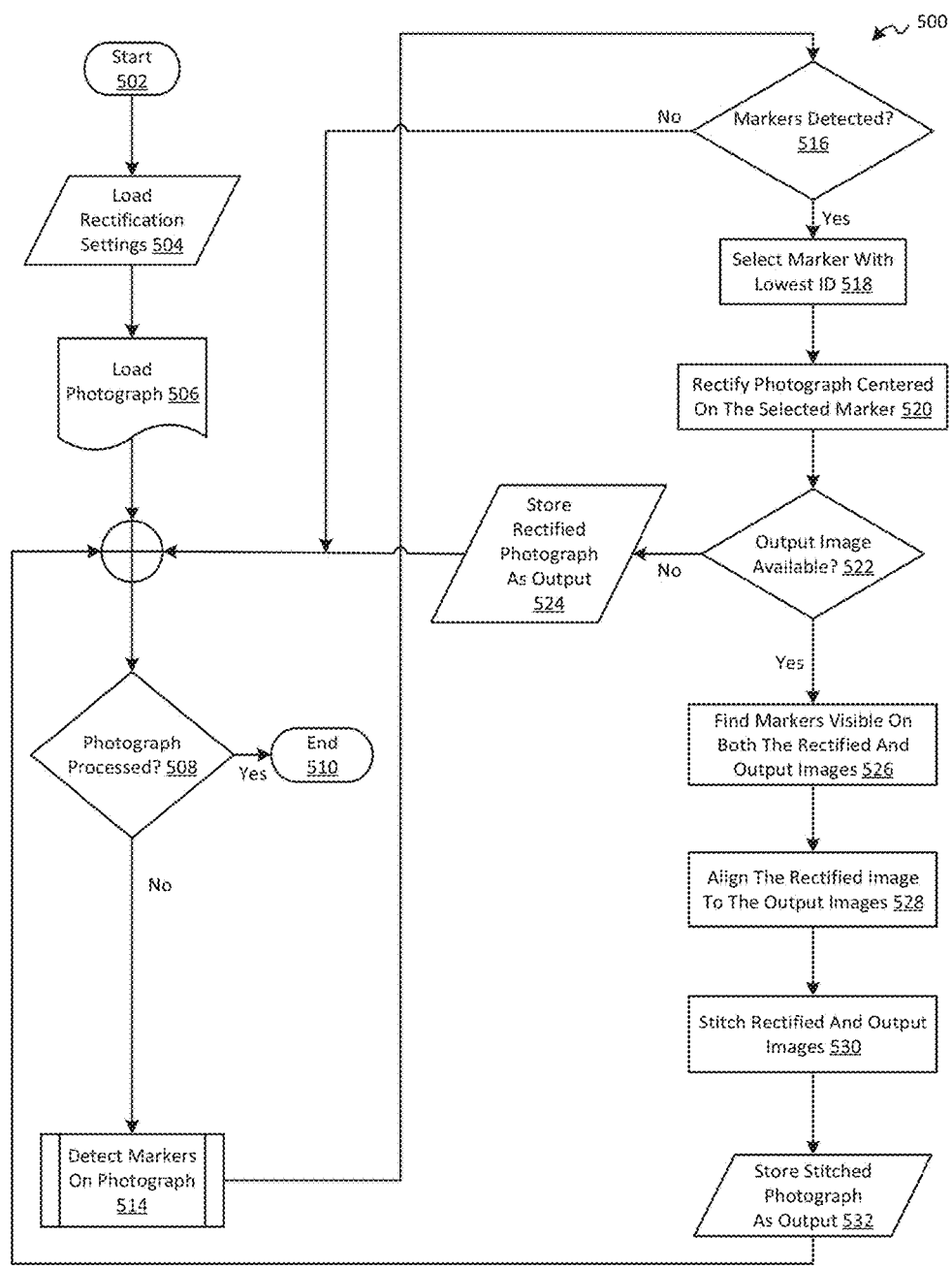
FIG. 5 is a flowchart diagram illustrating a method of rectifying a photograph of an object placed near one or more reference boards, according to one embodiment of the disclosure.

Referring now to FIG. 5, a flowchart diagram illustrates a method of rectifying a photograph of an object placed near one or more reference boards, according to one embodiment of the disclosure. The method 500 may be carried out through the use of any of the components of the system 100 of FIGS. 1-2B. Alternatively, the method 500 may be carried out with hardware different from that of the system 100 of FIGS. 1-2B.

The method 500 may start 502 with a step 504 in which rectification settings may be loaded into a suitable computing device. The rectification settings may include top-view space data 236 and/or data relating to the rectification process of digital images, as described herein. The top-view space data 236 may also be derived from reference board information contained in a suitable reference board definition file, as previously discussed. The reference board information may correspond to a single reference board or multiple reference boards, such as those shown in FIGS. 15-16B. The reference board information may contain reference marker definition data 238, including a list of relevant characteristics for all reference markers associated with the multiple reference boards (e.g., each reference marker's ID, relative location, dimensions, shapes, patterns, relative orientations, etc.).

Once the rectification settings have been loaded in the computing device, the method 500 may proceed to a step 506 in which a photograph of an object next to one or more markers may be loaded into the computing device, after which the method 500 may proceed to a step 508.

In the step 508, it may be determined whether the photograph has been completely processed by the method 500 and fully rectified, or not. For example, there may be a single reference board, or multiple reference boards, placed around the object. The rectification settings loaded in step 504 may define which markers may be associated with the single reference board, or multiple reference boards, that may be shown in the photograph. Each of these markers may have a unique ID number and each marker may, or may not, be detectable in the photograph. For each marker that is detected in the photograph, the program may rectify the image centered around each detected marker and then stitch all of these rectified images together to form a final/complete rectified photograph.

As one non-limiting example, if there are two reference boards in the photograph and both reference boards each contain two markers, then the method 500 may rectify the photograph four separate times corresponding to each of the four markers, where each rectification is centered around one of the four separate markers. After all four of these rectification processes have been completed, the method 500 may then stitch each of these rectified images together to form the final/complete rectified photograph.

If it is determined that all detected markers in the photograph have been processed by the method 500 for rectification and then stitched together to form the final/complete rectified photograph, then the method 500 may end 510. However, if it is determined that all detected markers in the photograph have not been processed by the method 500 for rectification and/or stitched together to form the final/complete rectified photograph, the method 500 may proceed to a step 514.

In the step 514, image processing techniques may be used to try and detect the one or more reference markers on the single board or multiple reference boards in the photograph. Once image processing techniques have been used to try and detect the one or more reference markers on the single board or multiple reference boards in the photograph, the method 500 may proceed to a step 516 in which it may be determined whether or not the detection process of step 514 was successful or not.

If it is determined in the step 516 that the detection process of step 514 was not successful, the method 500 may return to step 508. However, if it is determined in the step 516 that the detection process of step 514 was successful, the method 500 may proceed to a step 518.

In step 518, a reference marker with the lowest identification value may be selected from all of the reference markers that were detected in step 514.

Once the reference marker with the lowest identification value has been selected from all of the reference markers that were detected in step 514, the method 500 may proceed to a step 520 in which the photograph may be rectified and centered on the selected marker identified in step 518.

Once the photograph has been rectified and centered on the selected marker from step 518, the method may proceed to a step 522 in which it may be determined whether or not any prior output image(s) are available. If it is determined that no prior output image(s) are available, the method may proceed to a step 524 in which the rectified photograph from step 520 may be stored as output, and the method may then proceed to step 508. However, if it is determined that prior output image(s) are available, the method may proceed to a step 526 in which reference markers may be identified on both the rectified photograph from step 520 and the prior output image(s), and the process may proceed to a step 528.

In step 528, the rectified photograph from step 520 may be aligned with the prior output image(s) based on the reference markers identified on both the rectified photograph from step 520 and the prior output image(s), after which the process may proceed to a step 530.

In step 530, the aligned rectified photograph from step 520 and the prior output image(s) may be "stitched" together to form a single stitched rectified photograph that may be a more accurate representation of a rectified photograph, and the method 500 may then proceed to a step 532 in which the single stitched rectified photograph may be stored as output, and the method may then proceed to step 508.

Figure 6:
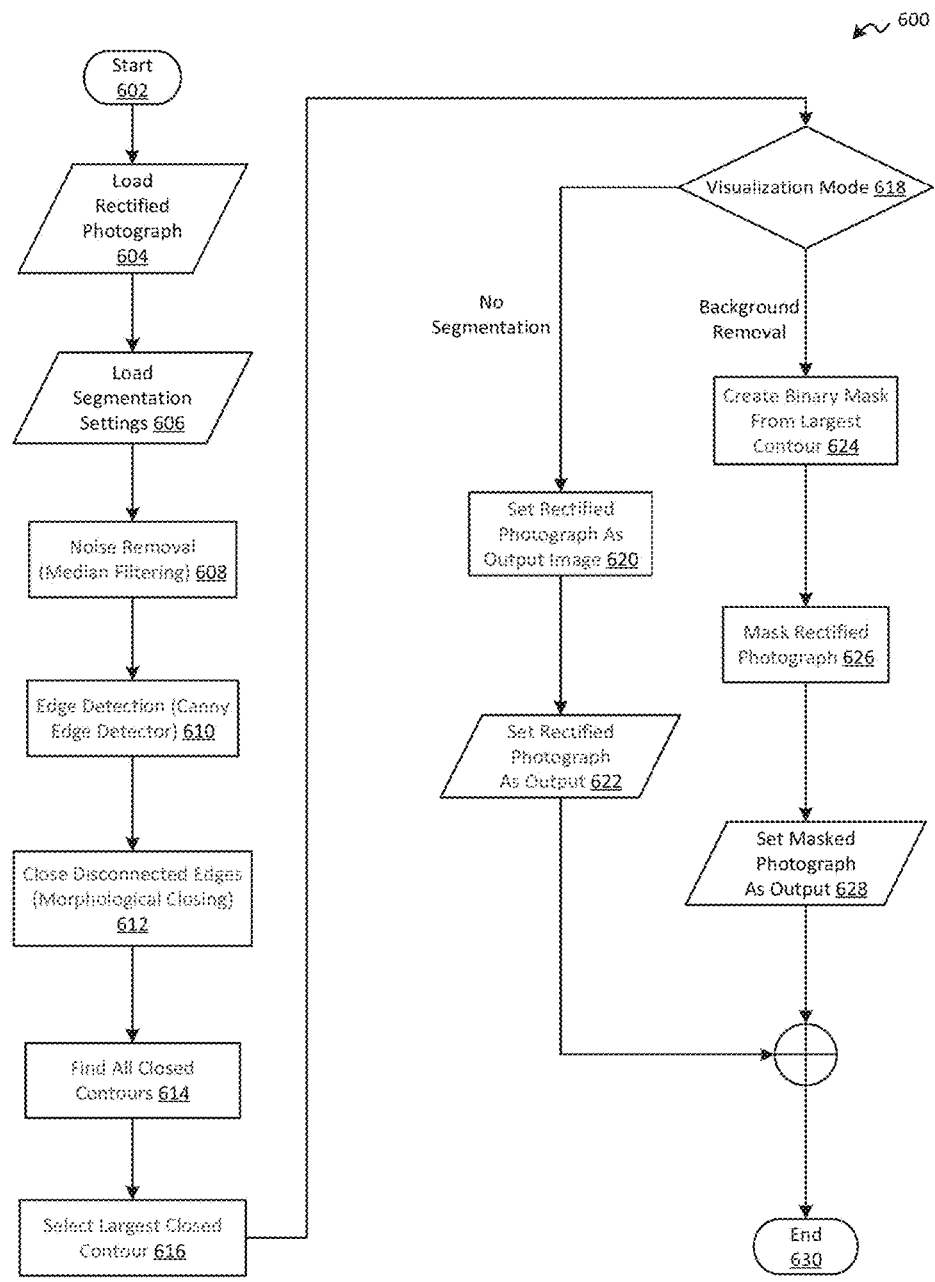
FIG. 6 is a flowchart diagram illustrating a method of segmenting an object in a photograph from the background in the photograph using edge detection techniques, according to one embodiment of the disclosure.

Referring now to FIG. 6, a flowchart diagram is illustrated of a method 600 of segmenting an object in a photograph from the background in the photograph using edge detection techniques, according to one embodiment of the disclosure. The method 600 may be carried out through the use of any of the components of the system 100 of FIGS. 1-2B. Alternatively, the method 600 may be carried out with hardware different from that of the system 100 of FIGS. 1-2B.

The method 600 may start 602 with a step 604 in which a rectified photograph may be loaded into a suitable computing device. Once the rectified photograph has been loaded into the computing device, the method 600 may proceed to a step 606 in which segmentation settings may be loaded into the computing device.

Once the segmentation settings have been loaded into the computing device, the method 600 may proceed to a step 608 in which the rectified photograph may undergo an image filtering/pre-processing step, such as median filtering, in order to remove noise from the digital photograph. Median filtering may be a desirable pre-processing step before Canny edge detection, as digital photographs often times contain noise which may degrade the performance of subsequent edge detection operations. Median filtering is a non-linear filtering process which replaces each pixel by the median value surrounding a pixel's "neighborhood", defined as a square box of a given radius. Median filtering may remove noise with performance similar to linear filters and may also conserve edges better than linear filters.

Once the median filtering process has completed, the method 600 may proceed to a step 610 in which thresholding or edge detection may occur, such as Canny edge detection. Canny thresholding is a widely used edge detection algorithm which receives a grayscale image as input and produces a binary image as output, where pixels are marked as background or edge. Canny thresholding begins by computing the image's gradients using Sobel filters and then computing the gradient's magnitude and orientation for each pixel. Each pixel in the magnitude image may be computed to two user-defined thresholds. Pixels which fall below the lower threshold may be marked as background whereas pixels above the upper threshold may be marked as edges. Pixels between the lower and upper thresholds can be set as background or edges depending on whether or not they are connected to other pixels marked as edges. Iteratively, the Canny edge detection algorithm may update undefined pixels until no further changes are made. For example, OpenCV's Canny function may be used allowing definition of the lower and upper thresholds as well as the aperture, defined as the size of the Sobel filters, and three or more aperture sizes may be available (e.g., 3, 5, or 7 pixels).

Once edge detection has occurred, the method 600 may proceed to a step 612 in which close disconnected edges may be closed using morphological closing techniques. For example, Canny algorithms may produce an image in which edges are marked, but there may be no guarantee that the edges form closed shapes. In fact, contours with a single missing pixel may not be considered closed. Morphological closing operations may be used to repair contours that are not connected/closed. The morphological closing operation may dilate edges, by a user-defined radius, and then erode the edges by the same amount. In this sequence of dilation followed by erosion, some small empty structures, such as edge discontinuities or small holes, can be filled up by the dilation process, but may not be opened up again by any following erosion process. In this manner, close disconnected edges may be closed using a morphological closing process.

Once the morphological closing process has completed, the method 600 may then proceed to a step 614 in which all closed contours in the processed image may be identified.

Once all closed contours in the processed image have been identified, the method 600 may then proceed to a step 616 in which a largest closed contour may be identified and selected. It may be logically expected that the largest closed contour, defined by the largest closed contour that encloses the largest number of pixels, most likely corresponds to the edges of the object to be segmented from the background in the photo.

Once the largest closed contour has been identified and selected, the method 600 may proceed to a step 618 in which a visual mode may be selected by the user. If the visual mode selected by the user is "no segmentation", the method may proceed to a step 620 in which the rectified photograph (with no segmentation) is set as an output image for display and displayed as output in a step 622, after which the method 600 may end 630. However, if the visual mode selected by the user is "background removal", the method may proceed to a step 624 in which a binary mask based on the largest closed contour found in step 616 may be created.

Once the binary mask based on the largest closed contour found in step 616 has been created, the method 600 may then proceed to a step 626 in which the rectified photograph may be masked in order to segment the object in the rectified photograph from the background in the rectified photograph and then displayed as output in a step 628, after which the method 600 may end 630.

Figure 7:
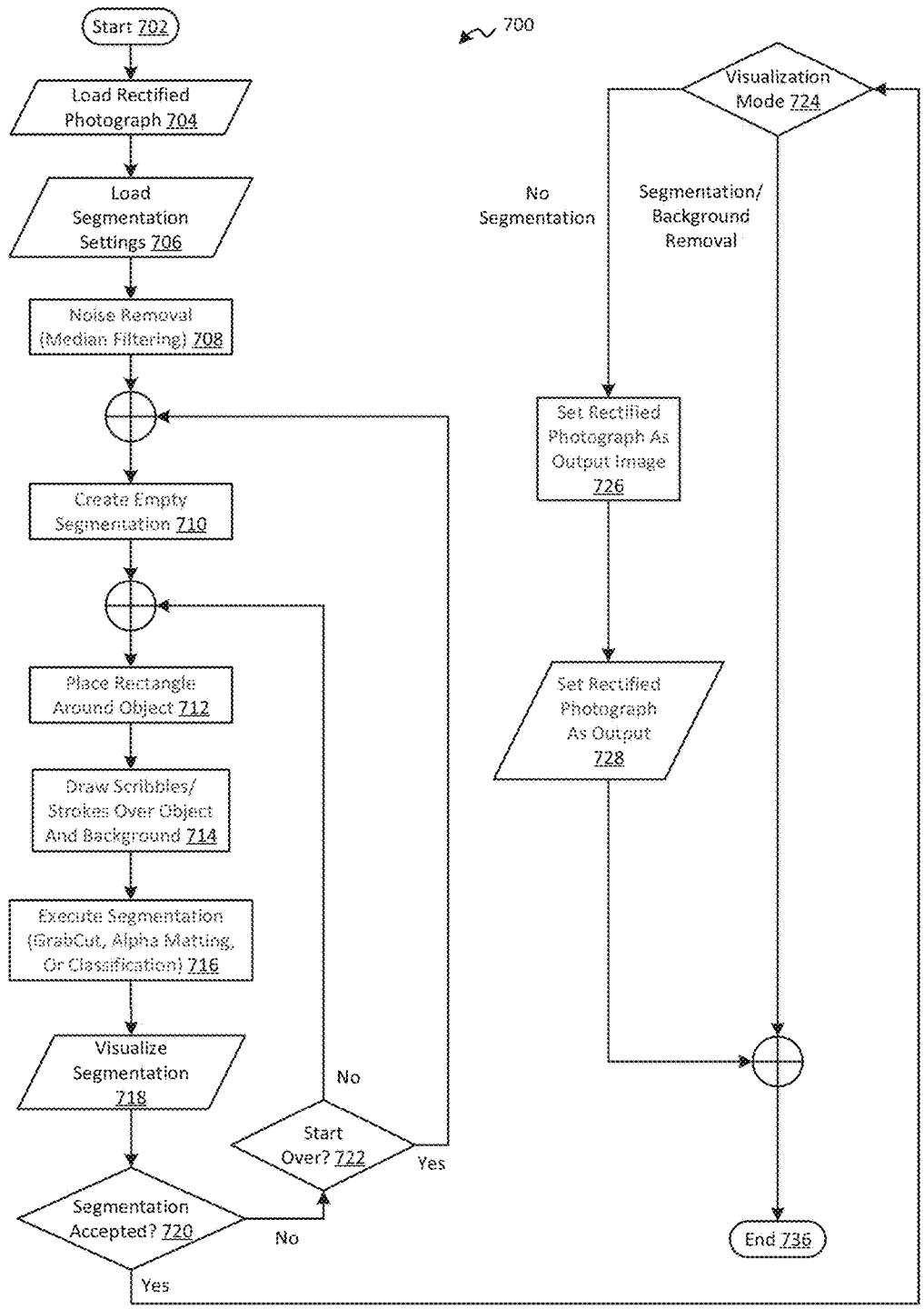
FIG. 7 is a flowchart diagram illustrating a method of segmenting an object in a photograph from the background in the photograph using GrabCut, alpha matting, and/or classification techniques, according to embodiments of the disclosure.

Referring now to FIG. 7, a flowchart diagram is shown of a method of segmenting an object in a photograph from the background in the photograph using GrabCut, alpha matting, and/or classification techniques, according to embodiments of the disclosure. The method 700 may be carried out through the use of any of the components of the system 100 of FIGS. 1-2B. Alternatively, the method 700 may be carried out with hardware different from that of the system 100 of FIGS. 1-2B.

The method 700 may start 702 with a step 704 in which a rectified photograph may be loaded into a suitable computing device. Once the rectified photograph has been loaded into the computing device, the method 700 may proceed to a step 706 in which segmentation settings may be loaded into the computing device.

Once the segmentation settings have been loaded into the computing device, the method 700 may proceed to a step 708 in which the rectified photograph may undergo an image filtering/pre-processing step, such as median filtering, in order to remove noise from the digital photograph.

Once the filtering/pre-processing step has been completed, the method 700 may proceed to a step 710 in which an empty segmentation of the filtered/rectified photograph may be created for use for further segmentation processes in subsequent steps of the method 700.

Once the empty segmentation of the filtered/rectified photograph has been created, the method 700 may proceed to a step 712 in which a rectangle may be placed around the object in the photograph to help subsequent segmentation processes identify the object for segmentation.

Once the rectangle has been placed around the object in the photograph, the method 700 may proceed to a step 714 in which the user may draw scribbles, or strokes, over portions of the object and portions of the background in the photograph to help subsequent segmentation processes distinguish the object from the background.

Once the user has drawn scribbles, or strokes, over portions of the object and the background, the method 700 may then proceed to a step 716 in which one or more segmentation processes may be executed. As three non-limiting examples, a GrabCut segmentation process, an Alpha Matting segmentation process, and/or a classification/machine learning process may be executed in step 716.

The GrabCut segmentation process may use graph cuts to automatically separate the object from the background of an image with no user interaction. Alternatively, a bounding box rectangle and/or brush tools may be utilized to allow the user to select the object and/or draw strokes on the object/background of the image.

The practice of segmenting an image into three regions (background, foreground and unknown) is known as creating a trimap. The Alpha Matting segmentation process may automatically create a trimap of the image and output the segmented image with no user interaction. Alternatively, the Alpha Matting segmentation process may utilize user intervention to create a trimap and segmented output image, such as strokes drawn on the object and the strokes drawn on the background to indicate regions in the foreground (object) and regions in the background.

The classification segmentation process may utilize machine learning, object recognition, and/or deep learning neural networks to accomplish identification and segmentation processes. In this example, the user may identify a desired object (e.g., type of clothing: shirt, pants, etc.) and then the classification segmentation process may query a prebuilt neural network, or use an object recognition algorithm, to isolate the foreground (clothing) based on the shape of the clothing. The classification segmentation process may also automatically rotate the clothing to the correct (vertical) position. Machine learning processes can also be used to allow the user to search for clothing based on desired dimensions. Thus, machine learning may allow different types of clothing to be "recognized" and key segments of the clothing (e.g., the neck-hole size of a shirt, the body length of a shirt, etc.) may also be recognized. The query results may only show those shirts that meet the user's specified conditions. Manufacturers may also utilize machine learning queries to receive analytics for purchased clothing items and clothing searches, excluding their clothing. For example, a manufacturer could see that 84% of men's shirt searches excluded a particular shirt that they produce. This may give the manufacturer insight on their product offerings and help the manufacturer fine tune their product line and/or identify niche markets that are underserved.

Once the one or more segmentation processes have been executed, the method 700 may then proceed to a step 718 in which the segmented photograph may be visualized by the user, after which the method 700 may proceed to a step 720.

In step 720, it may be determined whether a segmentation result for the photo is acceptable to the user, or not. If the segmentation result for the photo is not acceptable to the user, the method 700 may proceed to a step 722 in which the user may decide to start the segmentation process completely over again by creating a new empty segmentation (in which the method may then proceed to step 710), or by simply trying another manual segmentation process in order to possibly achieve a better segmentation result thereby (in which the process may then proceed to step 712). However, if the segmentation result for the photo is acceptable to the user, the method 700 may proceed to a step 724.

In step 724, a visual mode may default to "Background Removal" to segment the object from its background in the photograph and the method 500 may end 736. Alternatively, or in addition thereto, the visual mode may be selected and/or toggled by the user to a "No Segmentation" visual mode wherein the object is not segmented from its background. If the user selects "no segmentation" the method 700 may proceed to a step 726 in which the rectified photograph (with no segmentation) is set as an output image for display and then displayed as output in a step 728, after which the method 700 may end 736.

Figure 8:
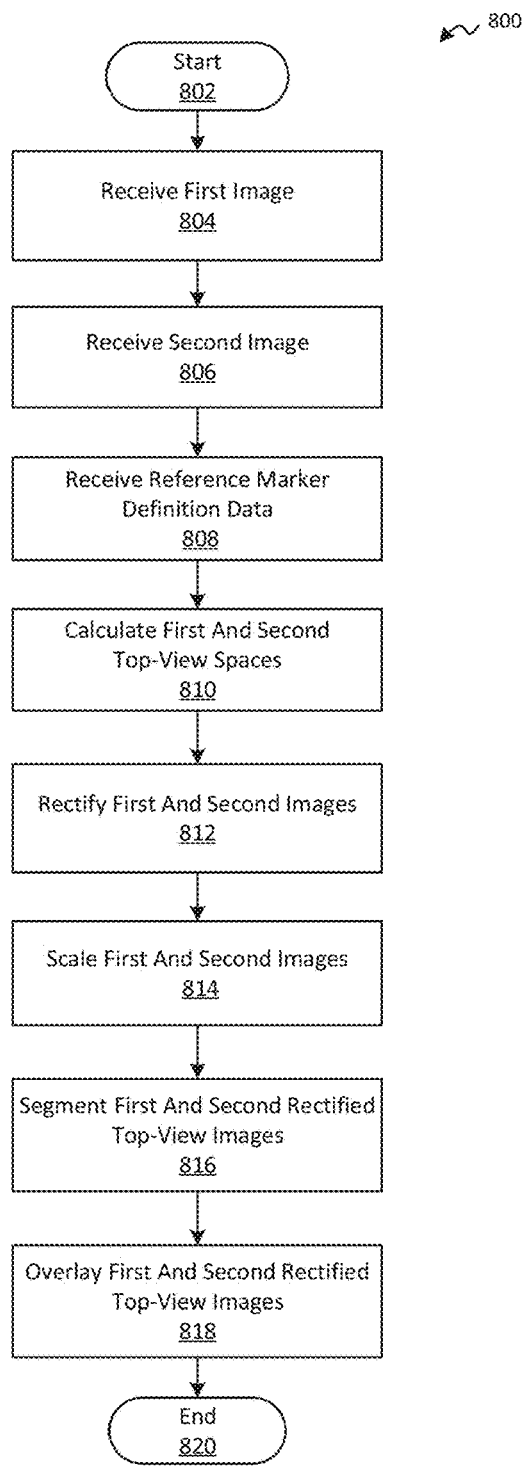
FIG. 8 is a flowchart diagram illustrating a method of preparing, displaying, and comparing images of at least two objects using computer vision, according to one embodiment of the disclosure.

Referring now to FIG. 8, a flowchart diagram is illustrated of a method 800 of preparing, displaying, and comparing images of at least two objects using computer vision, according to one embodiment of the disclosure. The method 800 may be carried out through the use of any of the components of the system 100 of FIGS. 1-2B. Alternatively, the method 800 may be carried out with hardware different from that of the system 100 of FIGS. 1-2B.

The method 800 may start 802 with a step 804 in which a first image comprising a first angled-view of a first object spaced apart from one or more first reference markers may be received by one or more processors, after which the method 800 may proceed to a step 806.

In step 806, a second image comprising a second angled-view of a second object spaced apart from one or more second reference markers may be received by the one or more processors, after which the method 800 may then proceed to a step 808.

In step 808, reference marker definition data comprising size, shape, and location information for the one or more first reference markers and/or the one or more second reference markers may be received by the one or more processors, after which the method 800 may then proceed to a step 810.

In step 810, a first top-view space for the first image based on the reference marker definition data and a second top-view space for the second image based on the reference marker definition data may be calculated by the one or more processors, after which the method 800 may then proceed to a step 812.

In step 812, the first image may be rectified by the one or more processors by transforming the first angled-view of the first image to a rectified first top-view of the first image based on a first set of correspondences between the one or more first reference markers in the first image and the first top-view space of the first image. The second image may also be rectified by the one or more processors by transforming the second angled-view of the second image to a rectified second top-view of the second image based on a second set of correspondences between the one or more second reference markers in the second image and the second top-view space of the second image, after which the method 800 may then proceed to a step 814.

In step 814, the rectified first top-view of the first image and the rectified second top-view of the second image may be scaled by the one or more processors to matching scales, based on the one or more first reference markers and the one or more second reference markers, such that accurate measurements may be taken between the first object and the second object, after which the method 800 may then proceed to a step 816.

In step 816, the first object may be segmented from a background of the rectified first top-view of the first image by one or more processors and the second object may be segmented from a background of the rectified second top-view of the second image by one or more processors in order to facilitate comparison of the one or more relative size differences between the first object and the second object, after which the method 800 may then proceed to a step 818.

In step 818, the rectified first top-view of the first image may be overlaid with the rectified second top-view of the second image on a display by one or more processors to enable comparison of one or more relative size differences between the first object and the second object, after which the method 800 may end 820.

It will be understood that any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Figure 9:
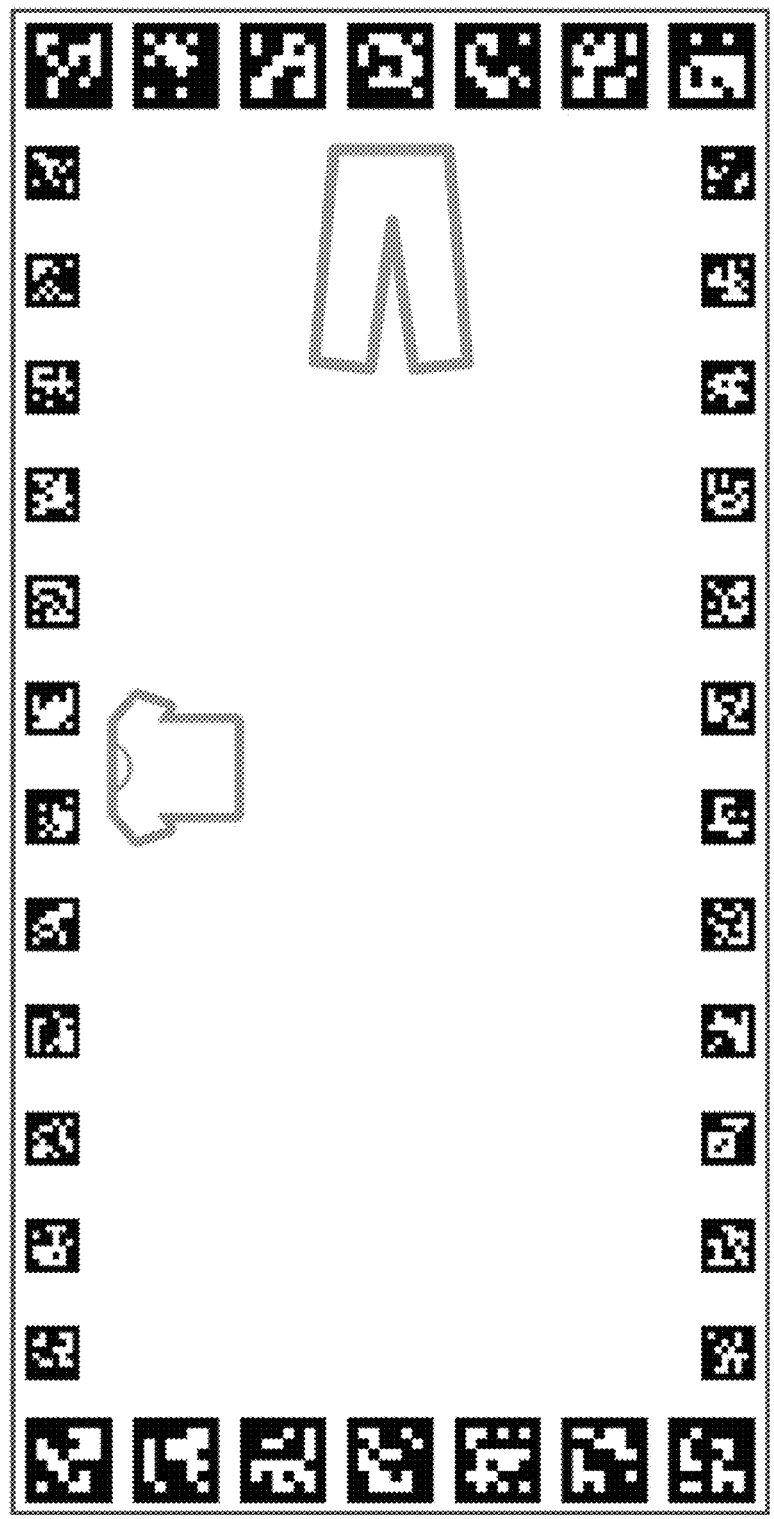
FIG. 9 is a top view of an example single reference board, according to one embodiment of the disclosure.

Referring to FIG. 9, a top-view of an example single reference board is shown, according to one embodiment of the disclosure. The single reference board may include one or more ArUco markers that are spaced along the outer edges of the single reference board, such that the one or more ArUco markers surround and define an interior space on the single reference board and an object placed on the interior space of the single reference board may also be surrounded by the one or more ArUco markers (see FIGS. 10 and 13). The single reference board may include one or more indications that instruct the user on how to orient different objects placed on the single reference board.

The interior space of the single reference board may have a substantially monochrome colored background (e.g., a white background, as one non-limiting example). However, in other embodiments the single reference board may be reversible and have a light colored background on a first side of the single reference board and a dark colored background on a second side of the single reference board. The dark colored background may be better for segmenting light colored objects that are placed thereon, and the light colored background may be better for segmenting dark colored objects that are placed thereon.

The single reference board may be any size and may be made of any suitable material(s) including, but not limited to: silicone, cloth, paper, plastics, etc.

Figure 10:
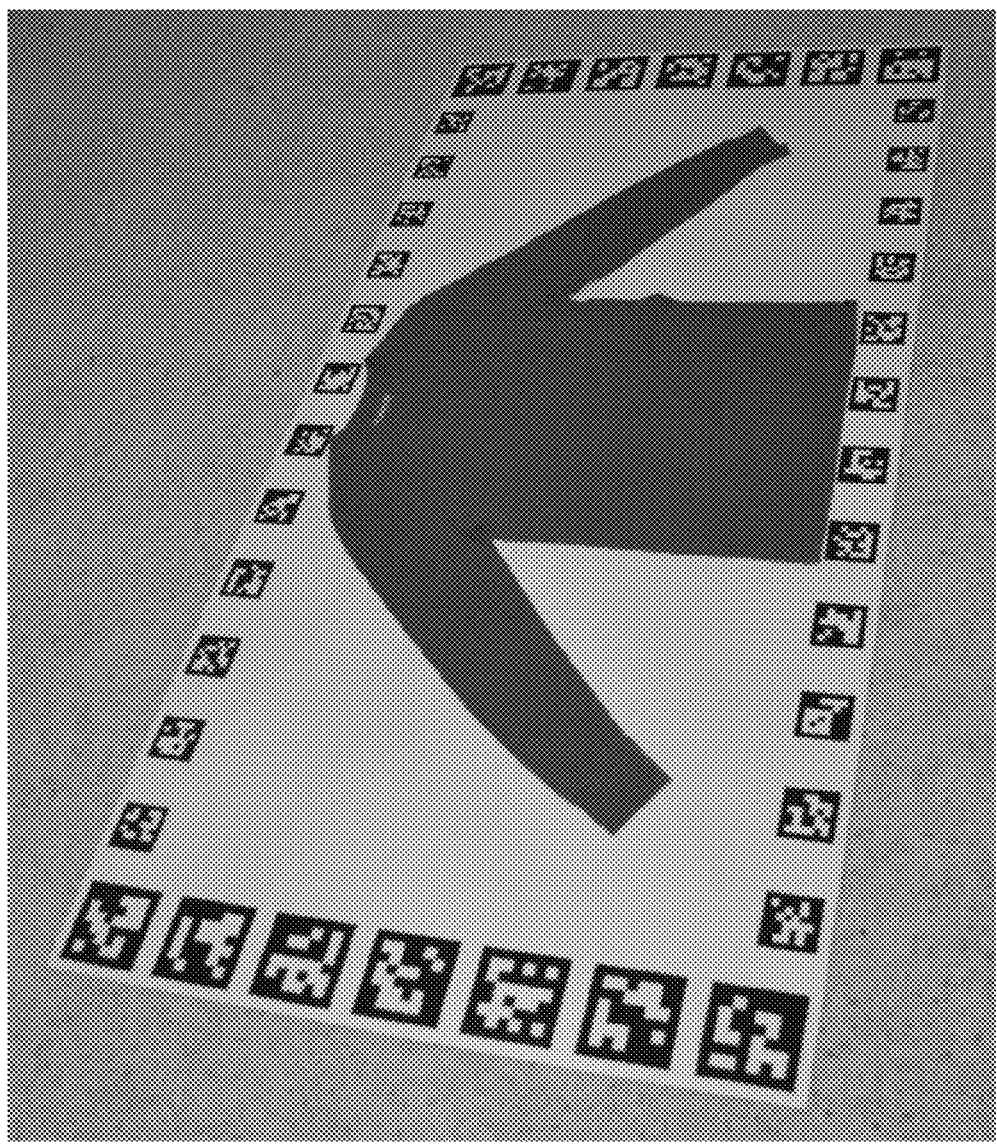
FIG. 10 is a picture, taken from an angled-view, of an example single reference board with an item of clothing disposed thereon, according to one embodiment of the disclosure.

FIG. 10 is a photograph of the example single reference board of FIG. 9 with a shirt placed thereon, where the photograph has been taken from an angled-view (as opposed to a top-view). This photograph may be rectified, scaled, and/or segmented according to the processes described herein and the shirt may then be compared and measured against other shirts that have undergone a similar image processing. It may be noted that customers may eventually not need their own reference board once they have identified suitable reference clothing items from a manufacturer. In this instance, the customer can use/download rectified photographs for his or her chosen reference clothing items from the manufacturer's server.

Figure 11:
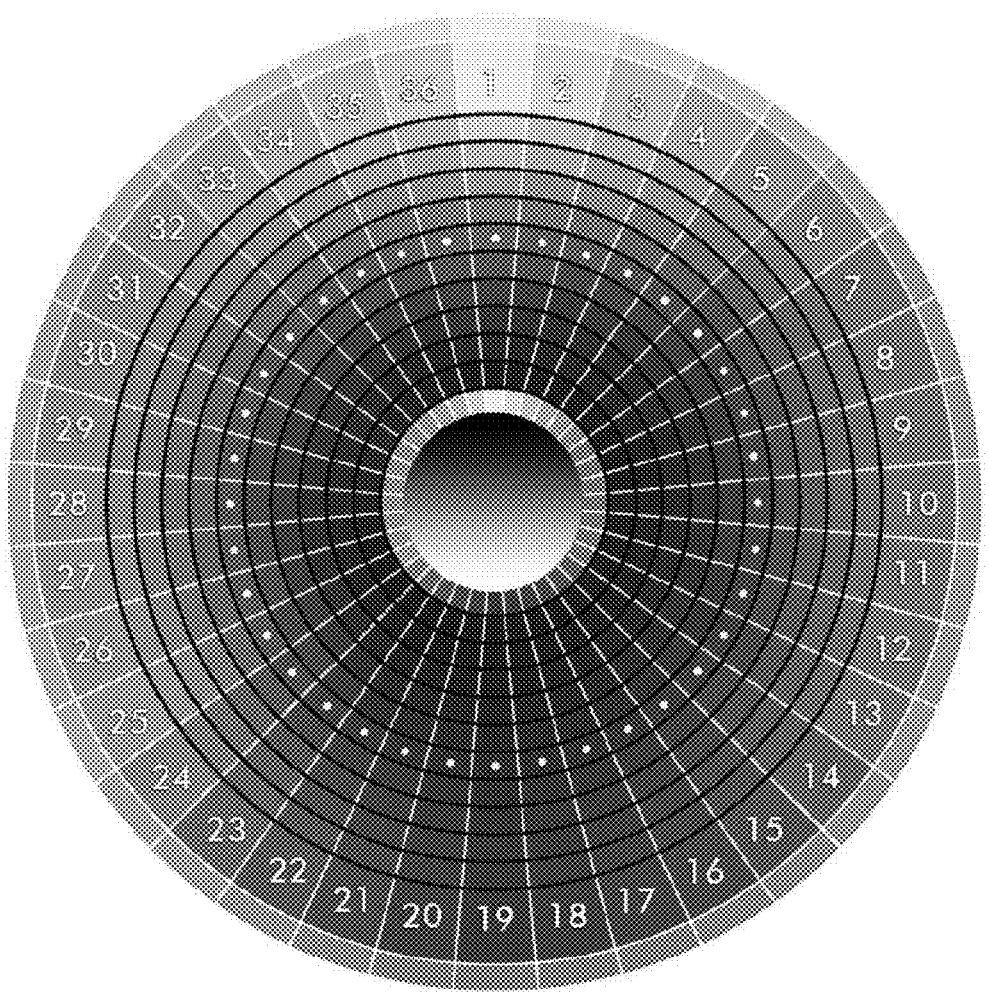
FIG. 11 shows a color chart, which may be used with embodiments of the present disclosure.

FIG. 11 shows an example color chart, which may be used with embodiments of the present disclosure. The example color chart may include various shades of color which may be labeled with one or more identifiers, such as numbering. The example color chart can be used to visually compare the relative coloring between two objects in different photographs, where both photographs include the same color chart in each photograph. In other words, the example color chart shown in FIG. 11 can be used to visually compare the relative coloring between two objects in different photographs, where both photographs include the same color chart in each photograph. In other embodiments, the color chart shown in FIG. 11 may also be used as a reference to compare the coloring of an object in a photograph with an identical color chart in the user's possession.

Figure 12:
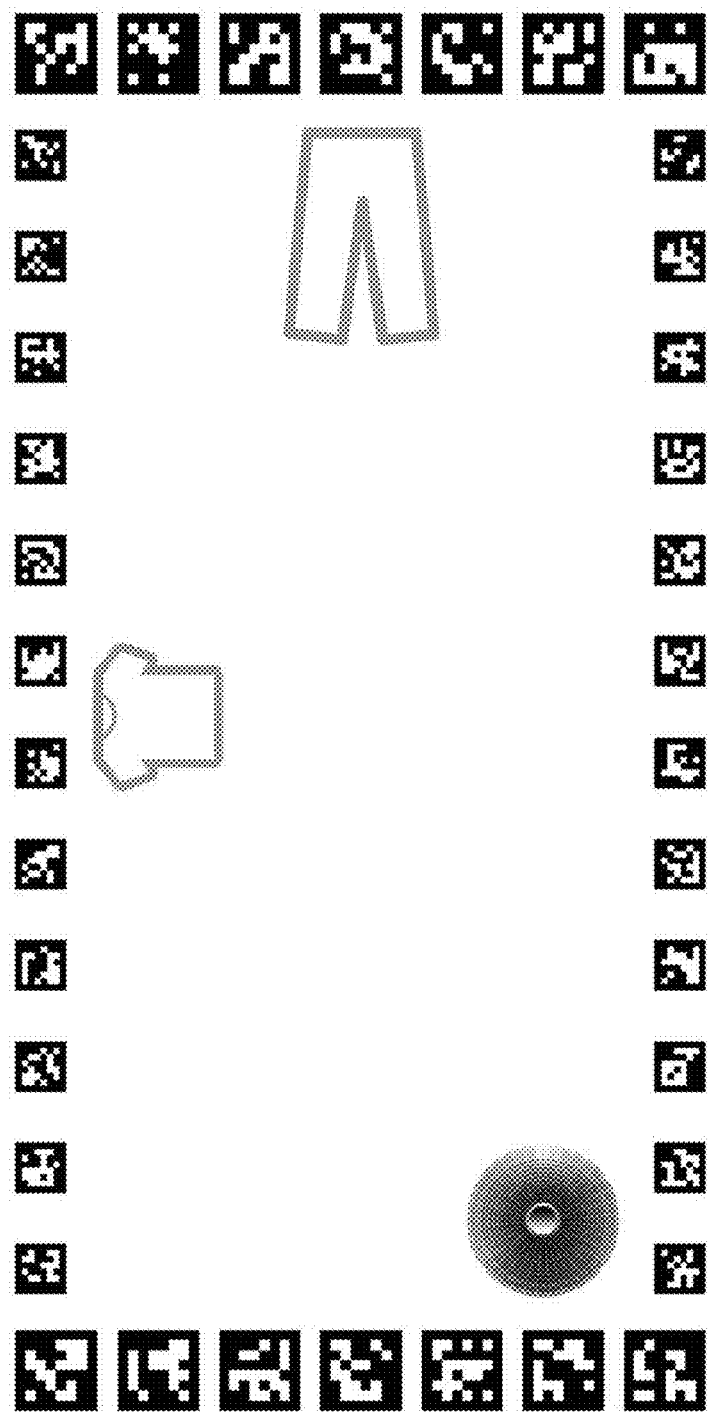
FIG. 12 is a top view of an example single reference board incorporating the color chart of FIG. 11, according to one embodiment of the disclosure.
Figure 13:
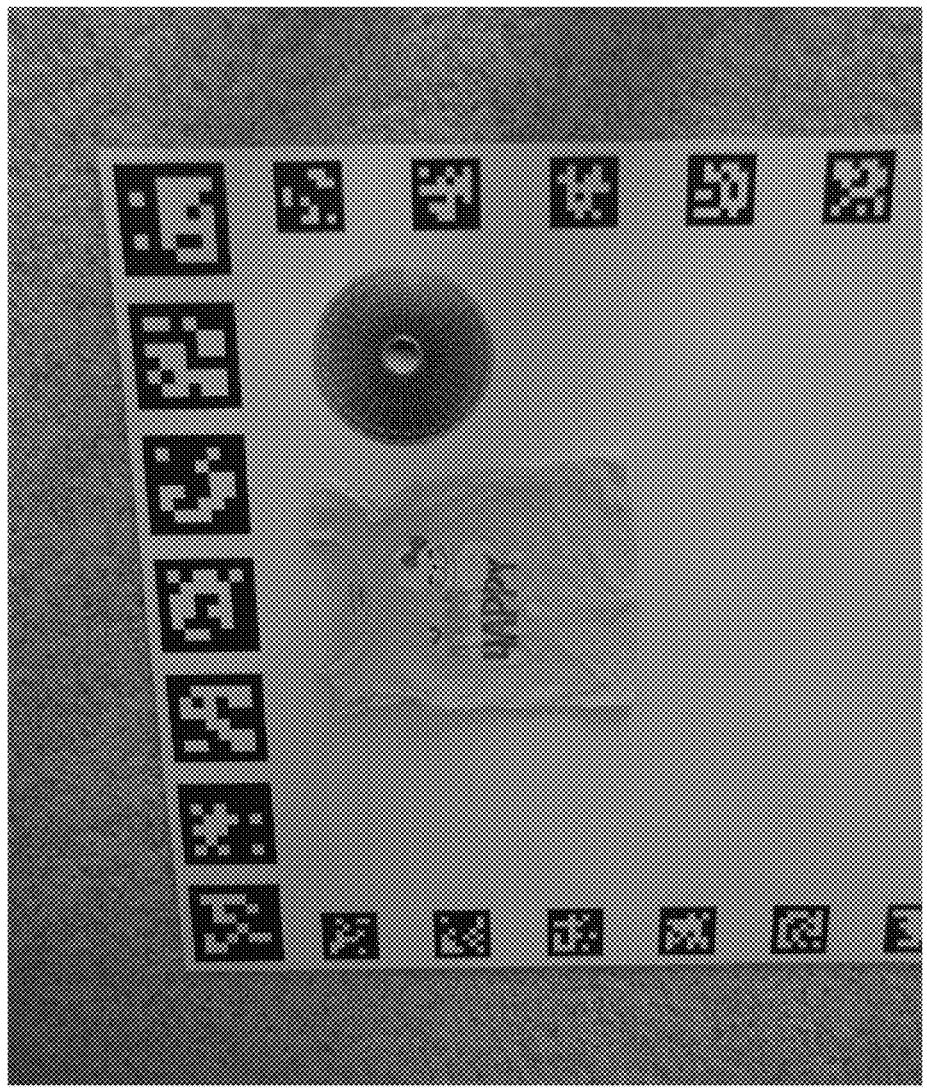
FIG. 13 is a picture, taken from an angled-view, of an example single reference board with color chart having an item of clothing disposed thereon, according to one embodiment of the disclosure.
Figure 14:
FIG. 14 is a picture of a color chart placed next to an item of clothing, according to one embodiment of the disclosure.
Figure 15A:
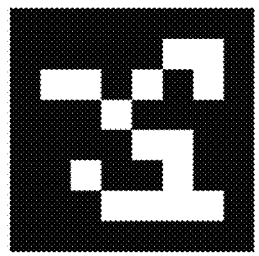
FIGS. 15A-D illustrate various top-views of standard-sized sheets of paper having one or more ArUco markers and placement instructions printed thereon, according to one embodiment of the disclosure.
Figure 15A:
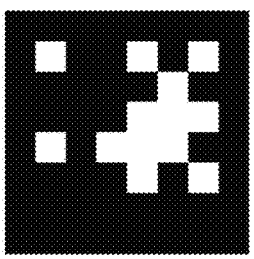
Figure 15B:
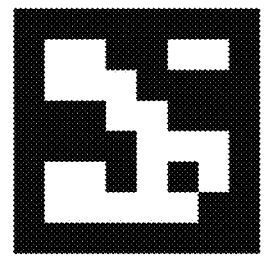
Figure 15B:
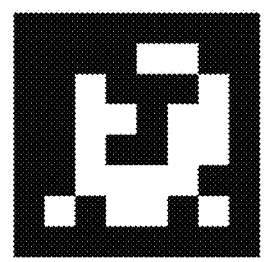
Figure 15C:
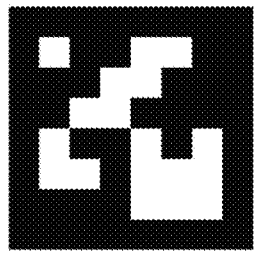
Figure 15C:
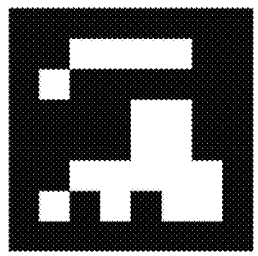
Figure 15D:
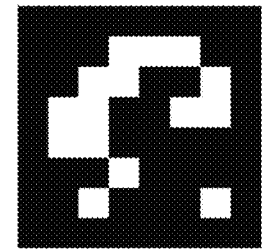
Figure 15D:
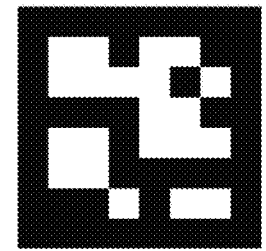

FIG. 12 shows a top view of the example single reference board of FIG. 9 incorporating the color chart of FIG. 11; FIG. 13 is a picture, taken from an angled-view, of the example single reference board of FIG. 9 with the color chart and an item of clothing disposed thereon next to the color chart; and FIG. 14 shows a close up view of the color chart alone next to the item of clothing.

FIGS. 15A-D illustrate various top-views of four standard-sized sheets of paper having one or more ArUco markers and placement instructions/indications printed thereon, according to one embodiment of the disclosure. In this embodiment the standard-sized sheets of paper (e.g., 8.5"×11", A4 sized paper, or any other paper size) may be printed with ArUco markers from a printer. The standard sized-sheets of paper may then be arranged around an object according to the placement instructions/indications in the same plane as the object on a relatively flat surface. For example, the placement instructions/indications printed on the standard sized sheets of paper may indicate which ArUco markers should be placed to the upper left, upper right, lower left, and lower right around the object.

While FIGS. 15A-D illustrate four standard-sized sheets of paper in a particular embodiment, it will be understood that in another embodiment one standard-sized sheet of paper may be utilized, and in yet other embodiments multiple standard-sized sheets of paper of any number may also be utilized.

Figure 16A:
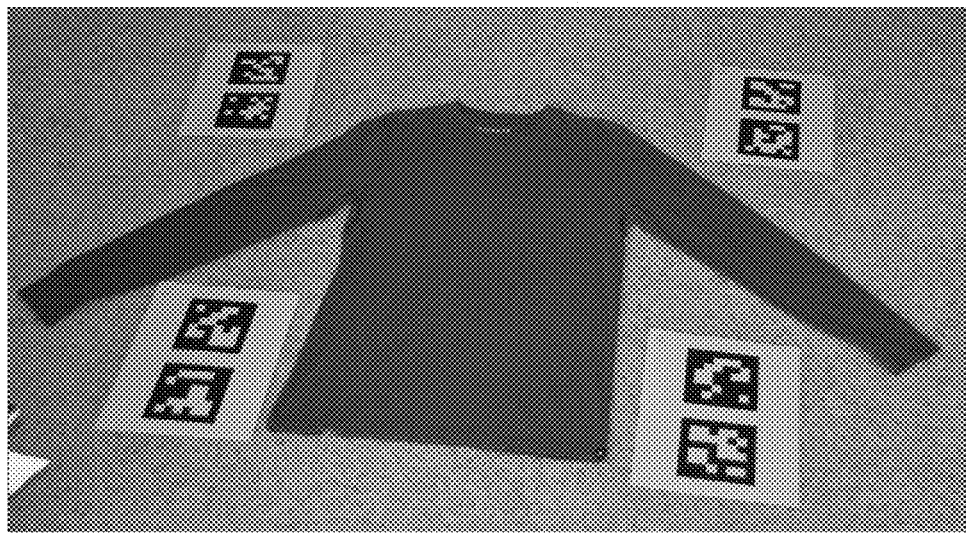
FIG. 16A is a picture, taken from an angle, of the standard-sized sheets of paper of FIGS. 15A-D arranged around an item of clothing, according to one embodiment of the disclosure.
Figure 16B:
FIG. 16B is a picture, taken from an angle, of the standard-sized sheets of paper of FIGS. 15A-D and the color chart of FIG. 14 arranged around an item of clothing, according to one embodiment of the disclosure.

Examples of the arrangement of the four standard-sized sheets of paper around different objects can be seen in FIGS. 16A and 16B. FIG. 16A shows a picture of the standard-sized sheets of paper of FIGS. 15A-D arranged around a first shirt and FIG. 16B shows a picture of the standard-sized sheets of paper of FIGS. 15A-D arranged around a second shirt and a color chart.

FIGS. 17-35 show various screenshots of example Graphical User Interfaces (GUI's) with various rectified images of articles of clothing for sizing comparisons. In general, the example GUI's may include various controls for image segmentation, selecting/moving/rotating/panning/zooming the background and/or foreground images (or both) and visualization of background and/or foreground images (or both together).

Figure 17:
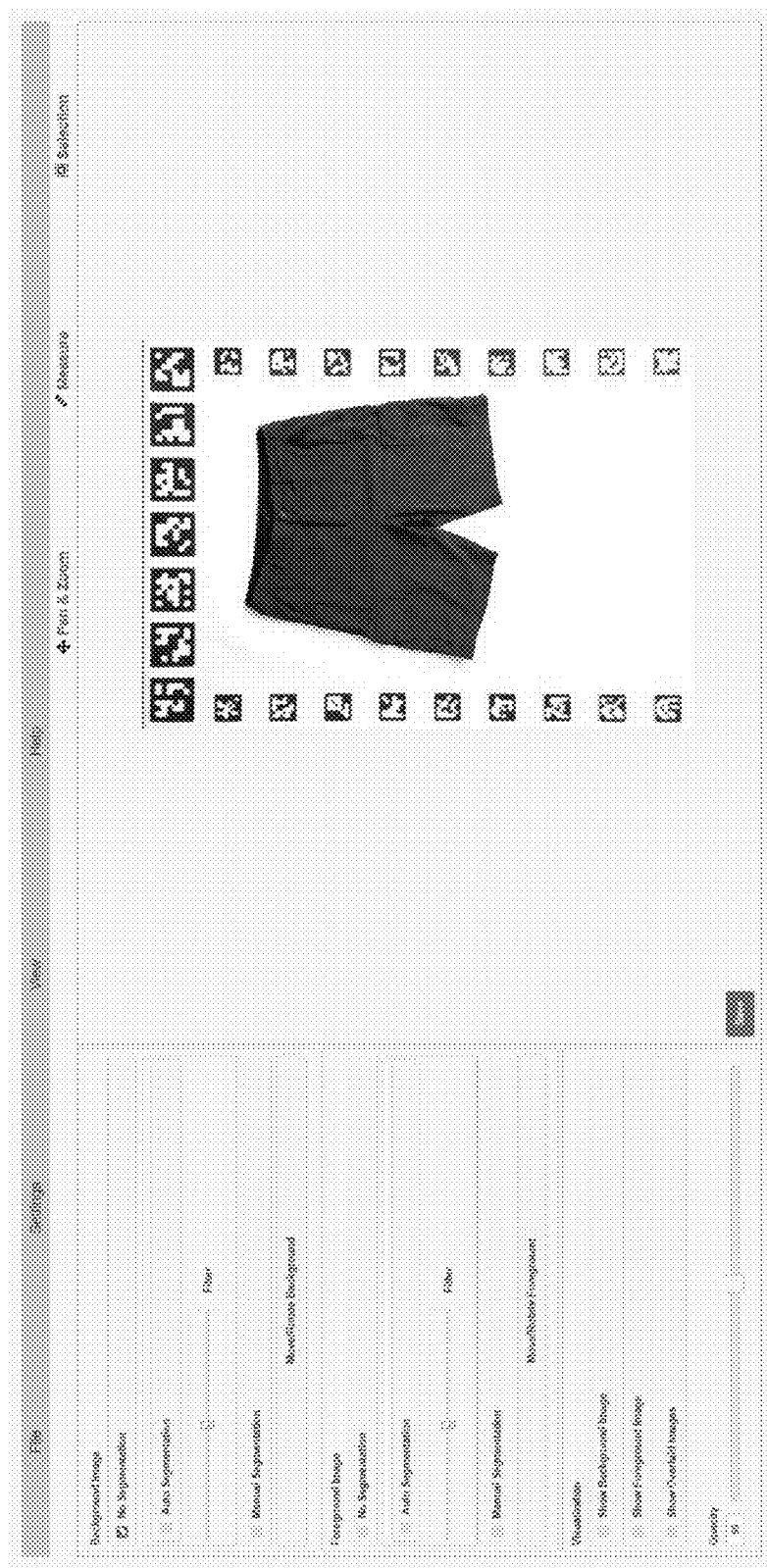
FIG. 17 is a screenshot of a Graphical User Interface (GUI) illustrating an image of an item of clothing that has not been segmented from the background of the image, according to one embodiment of the disclosure.

FIG. 17 is a screenshot of a GUI illustrating an image of an item of clothing that has not been segmented from the background of the image. The user may select "no segmentation" for either the background image, the foreground image, or both images.

Figure 18:
FIG. 18 is a screenshot of a GUI illustrating an image of an item of clothing that has been automatically segmented from the background of the image, according to one embodiment of the disclosure.

FIG. 18 is a screenshot of a GUI illustrating an image of the item of clothing that has been automatically segmented from the background of the image to remove the background from the image. Automatic segmentation can be achieved by the methods described with reference to FIGS. 6 and 7 herein.

Figure 19:
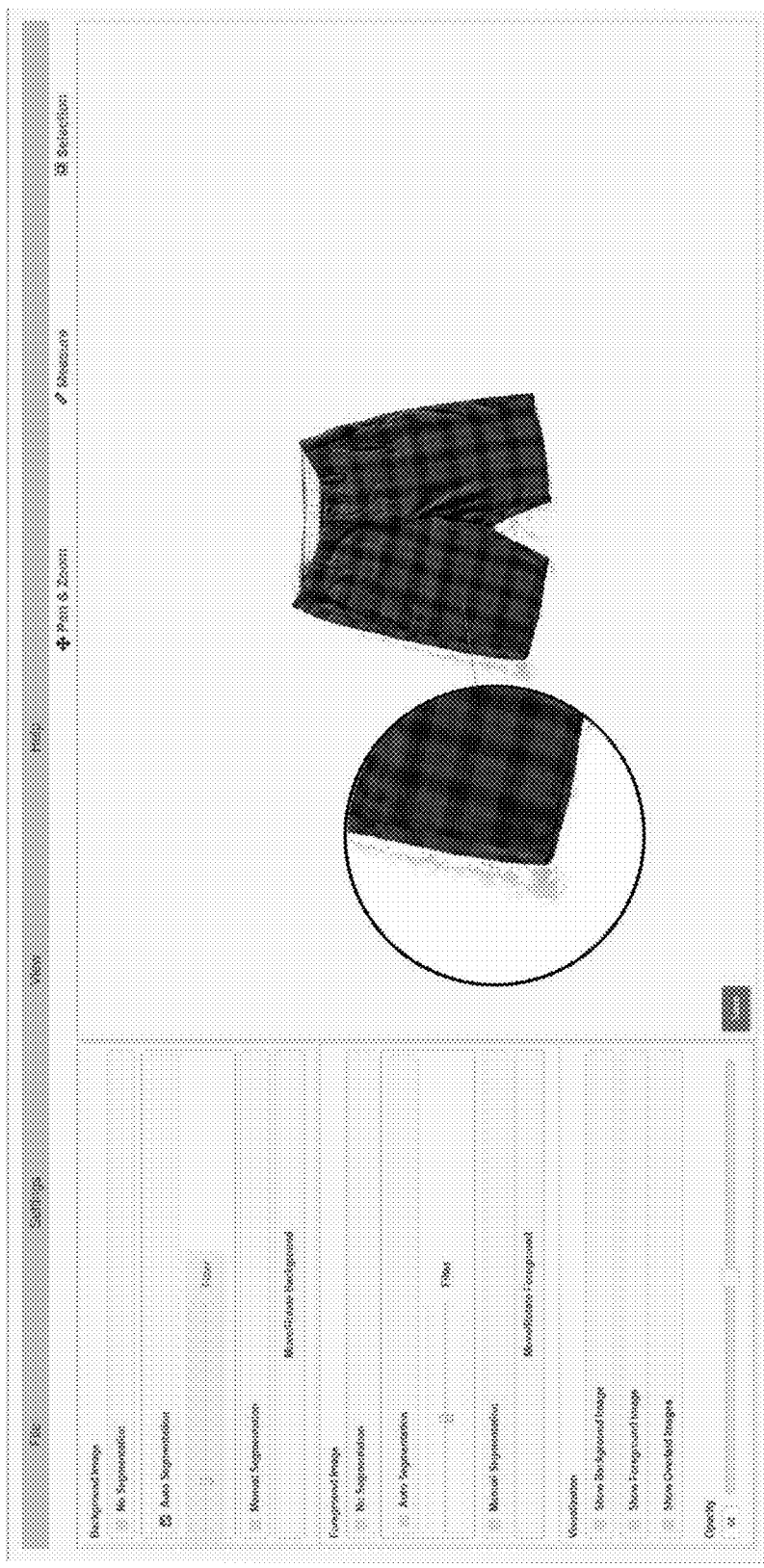
FIG. 19 is a screenshot of a GUI illustrating an image of an item of clothing showing segmentation artifacts, according to one embodiment of the disclosure.
Figure 20:
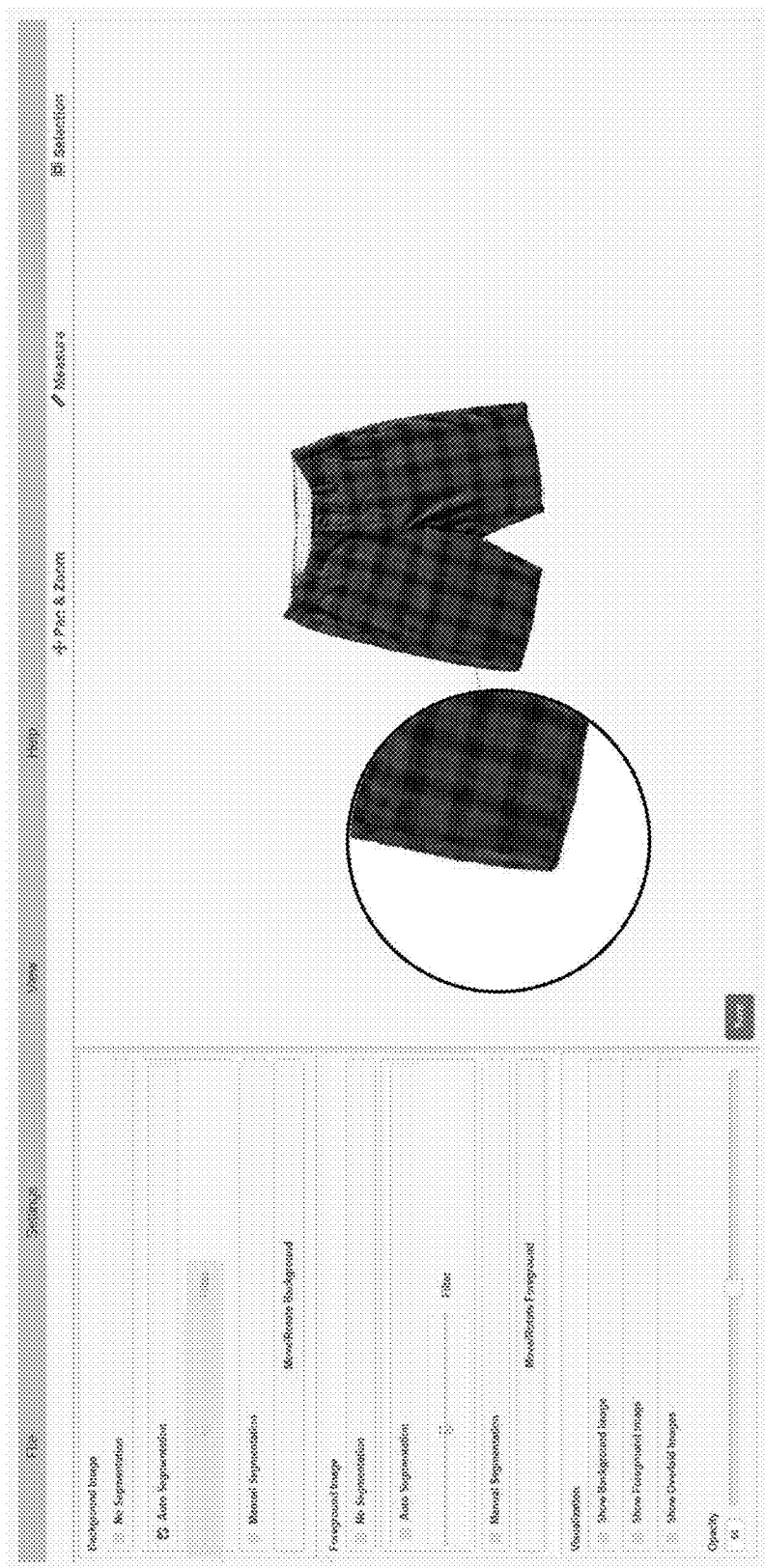
FIG. 20 is a screenshot of a GUI illustrating an image of an item of clothing showing no segmentation artifacts, according to one embodiment of the disclosure.

FIG. 19 is a screenshot of a GUI illustrating an image of an item of clothing showing segmentation artifacts around the item of clothing. FIG. 20 is a screenshot of a GUI illustrating the item of clothing of FIG. 19 with no segmentation artifacts around the item of clothing. In this example, the user may move a segmentation filter slider back and forth in order to change an edge detection threshold in real-time and remove artifacts from a faulty segmentation (and/or generally improve the quality of the segmentation).

Figure 21:
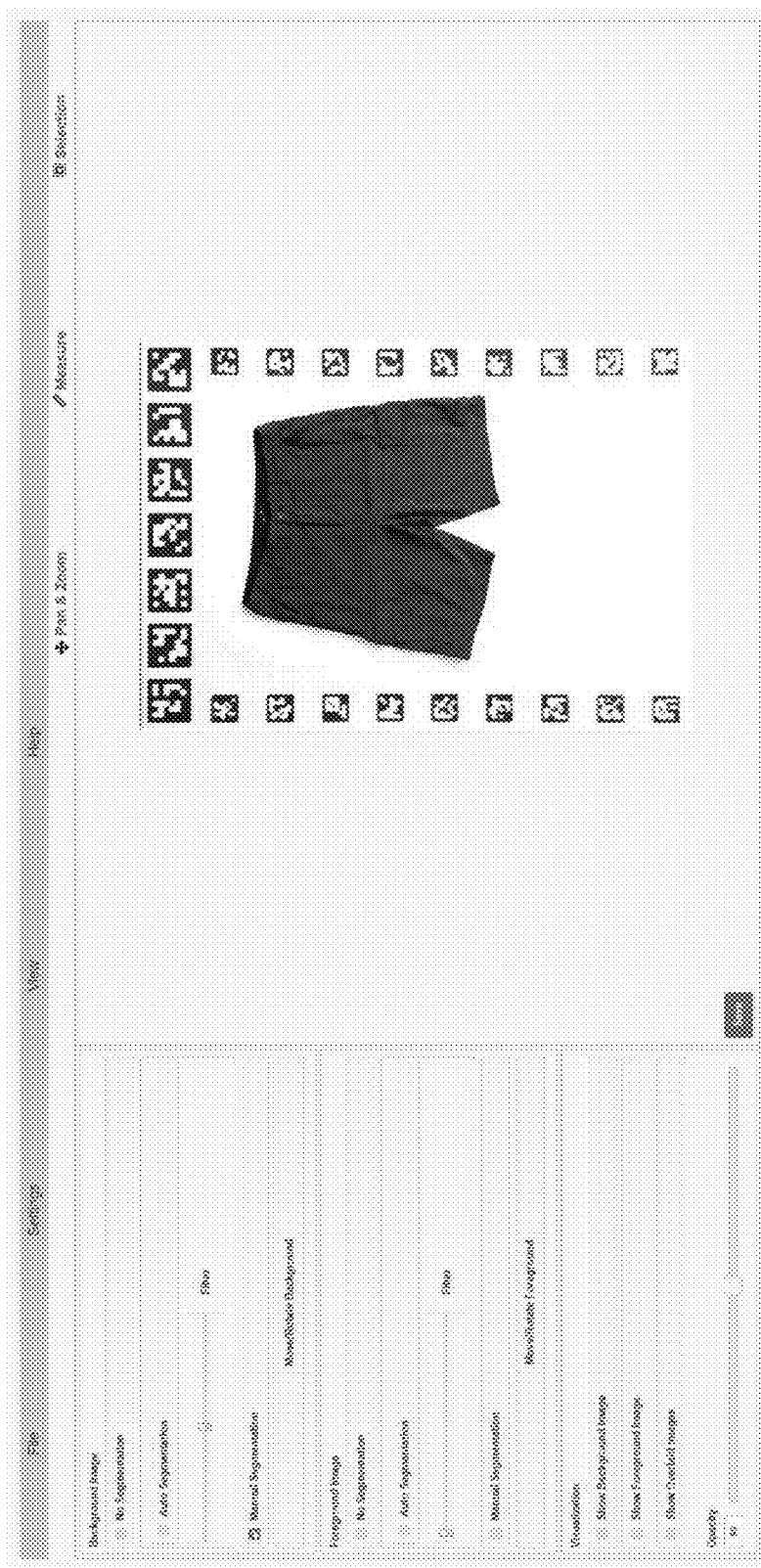
FIG. 21 is a screenshot of a GUI illustrating an image of an item of clothing at the start of a manual segmentation process, according to one embodiment of the disclosure.
Figure 22:
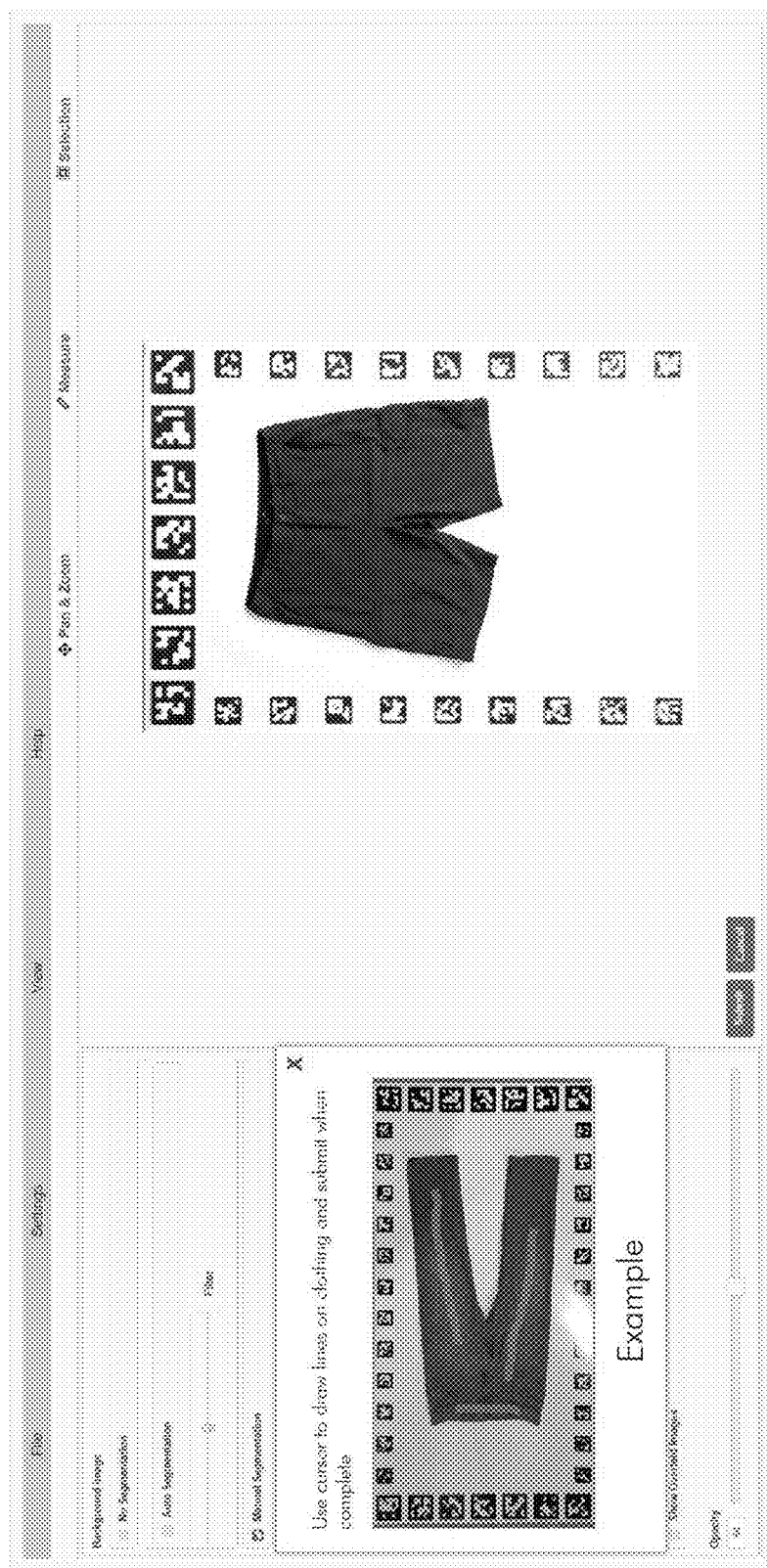
FIG. 22 is a screenshot of a GUI illustrating the image of FIG. 21 with user instructions on how to draw strokes on the item of clothing, according to one embodiment of the disclosure.
Figure 23:
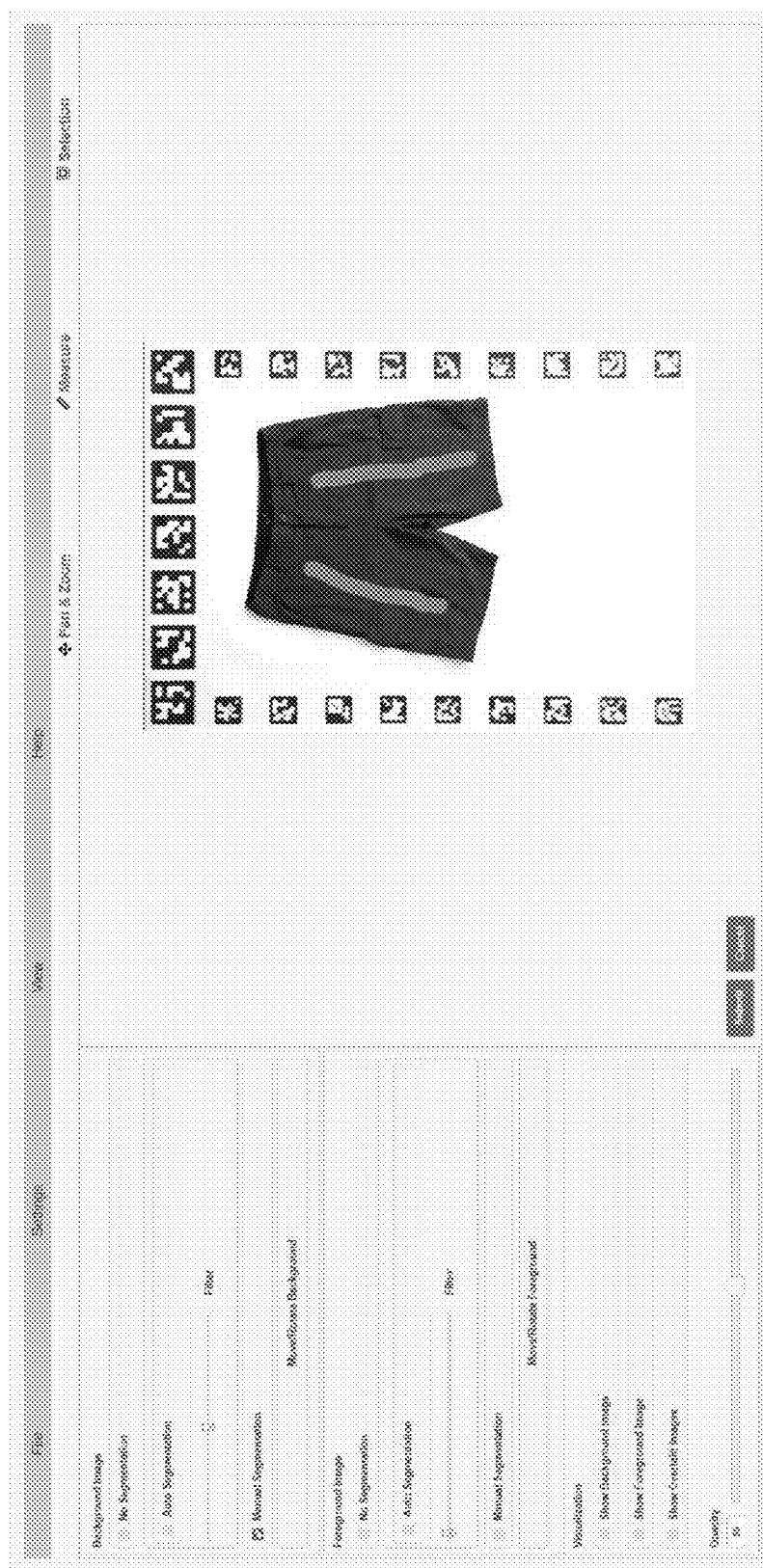
FIG. 23 is a screenshot of a GUI illustrating the image of FIG. 21 including user drawn strokes on the item of clothing, according to one embodiment of the disclosure.
Figure 24:
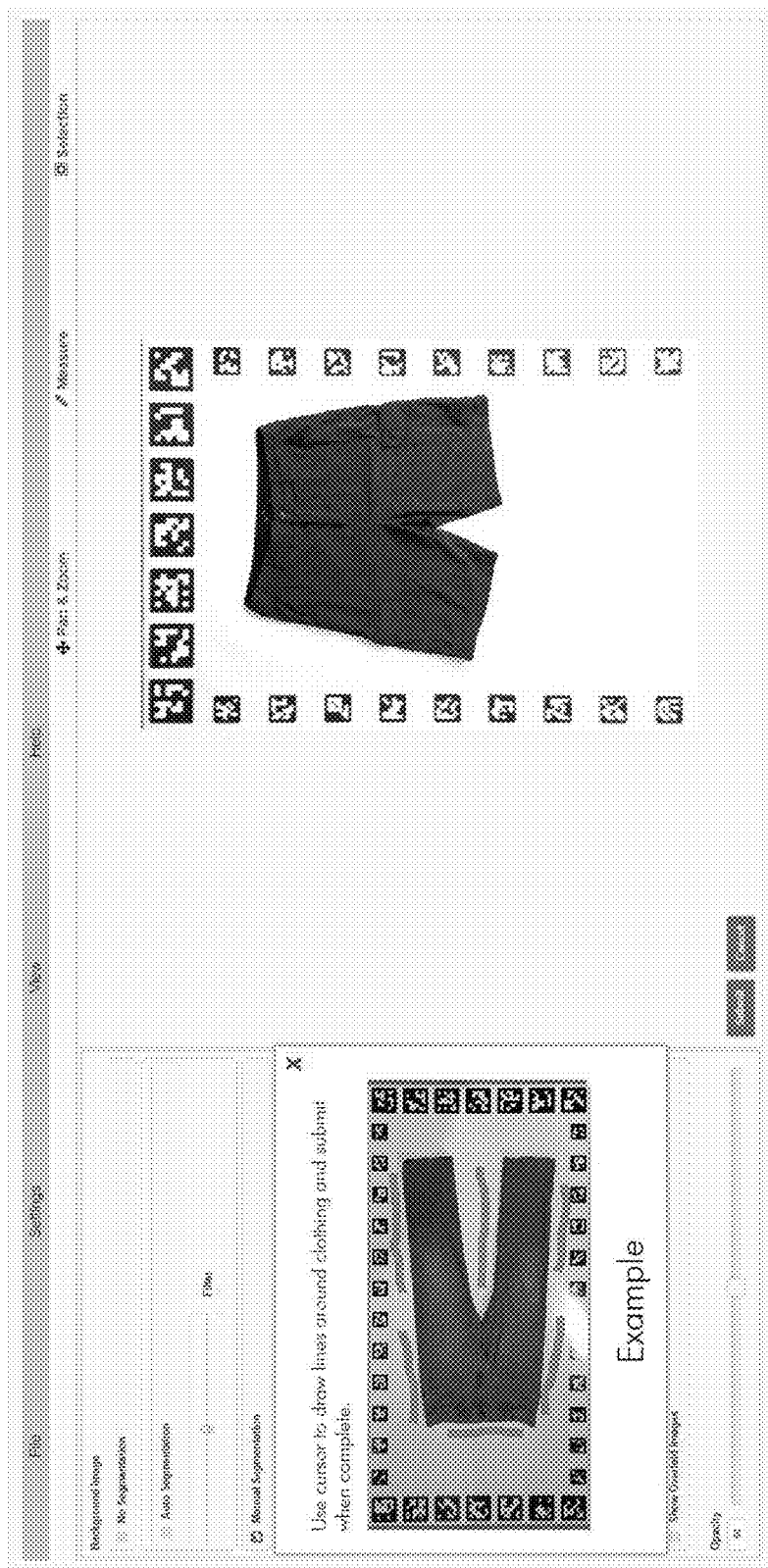
FIG. 24 is a screenshot of a GUI illustrating the image of FIG. 21 including user instructions on how to draw strokes on the background of the image, according to one embodiment of the disclosure.
Figure 25:
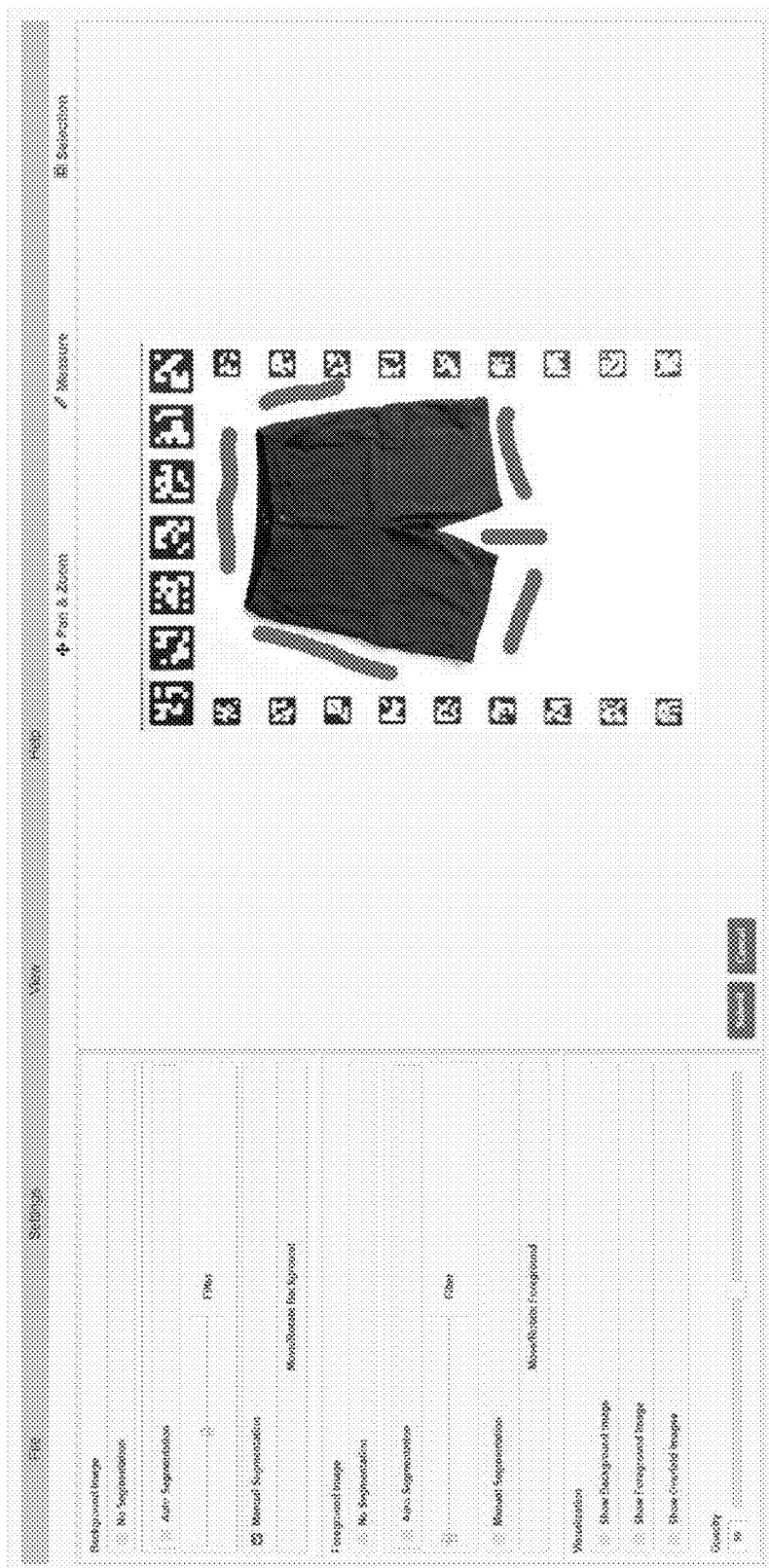
FIG. 25 is a screenshot of a GUI illustrating the image of FIG. 21 including user drawn strokes on the background of the image, according to one embodiment of the disclosure.
Figure 26:
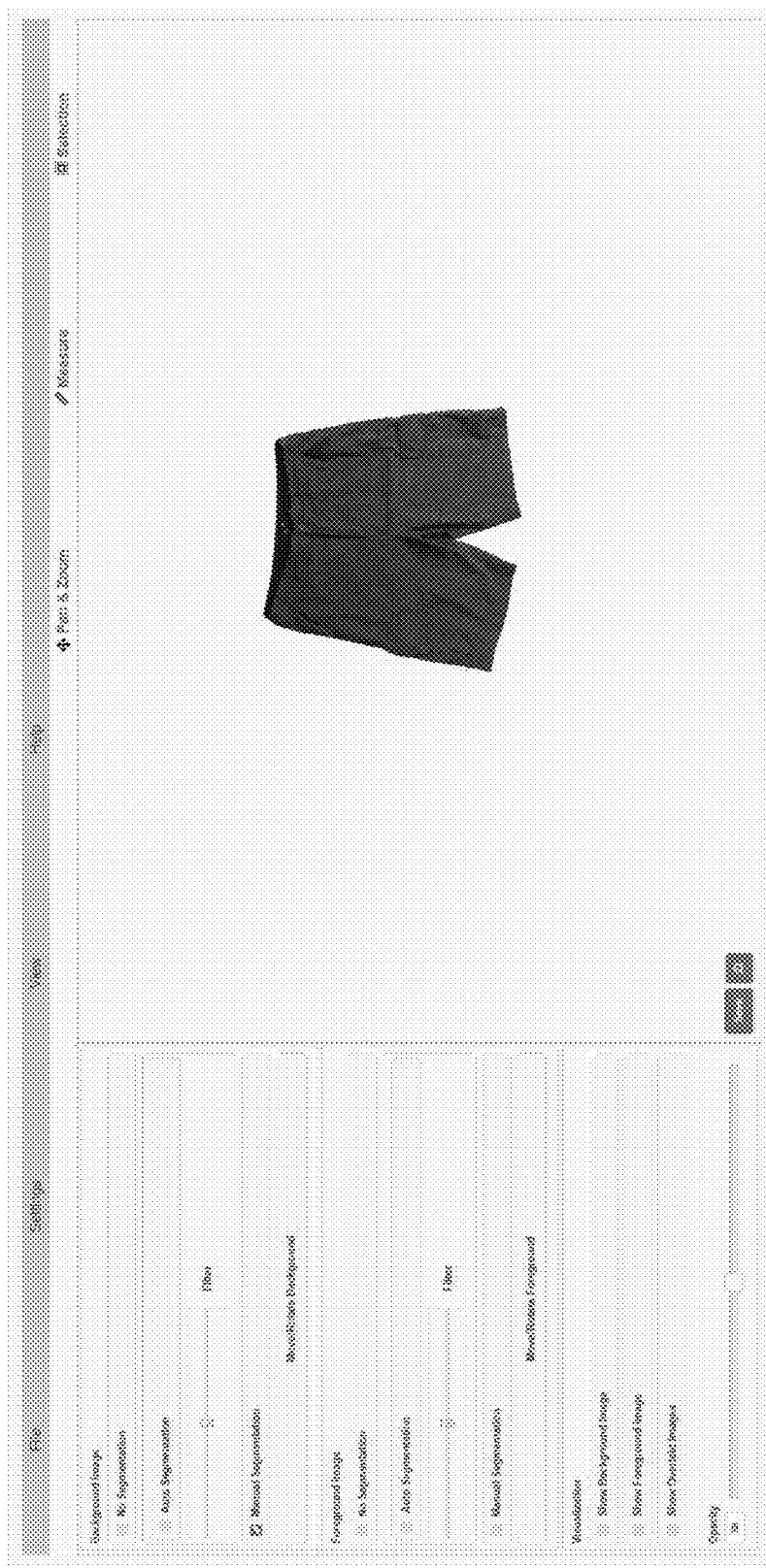
FIG. 26 is a screenshot of a GUI illustrating the article of clothing of FIG. 21 completely segmented from the background of the image at the end of the manual segmentation process, according to one embodiment of the disclosure.

FIG. 21 is a screenshot of a GUI illustrating an image of an item of clothing at the start of a manual segmentation process (i.e., segmentation of the object from the background has not yet occurred); FIG. 22 is a screenshot of a GUI illustrating the image of FIG. 21 with user instructions on how to draw strokes on the item of clothing to help the segmentation process better identify the item of clothing; FIG. 23 is a screenshot of a GUI illustrating the image of FIG. 21 including user drawn strokes on the item of clothing; FIG. 24 is a screenshot of a GUI illustrating the image of FIG. 21 including user instructions on how to draw strokes on the background of the image to help the segmentation process better identify the background of the image; FIG. 25 is a screenshot of a GUI illustrating the image of FIG. 21 including user drawn strokes on the background of the image around the item of clothing; and FIG. 26 is a screenshot of a GUI illustrating the article of clothing of FIG. 21 completely segmented from the background of the image at the end of the manual segmentation process.

Figure 27:
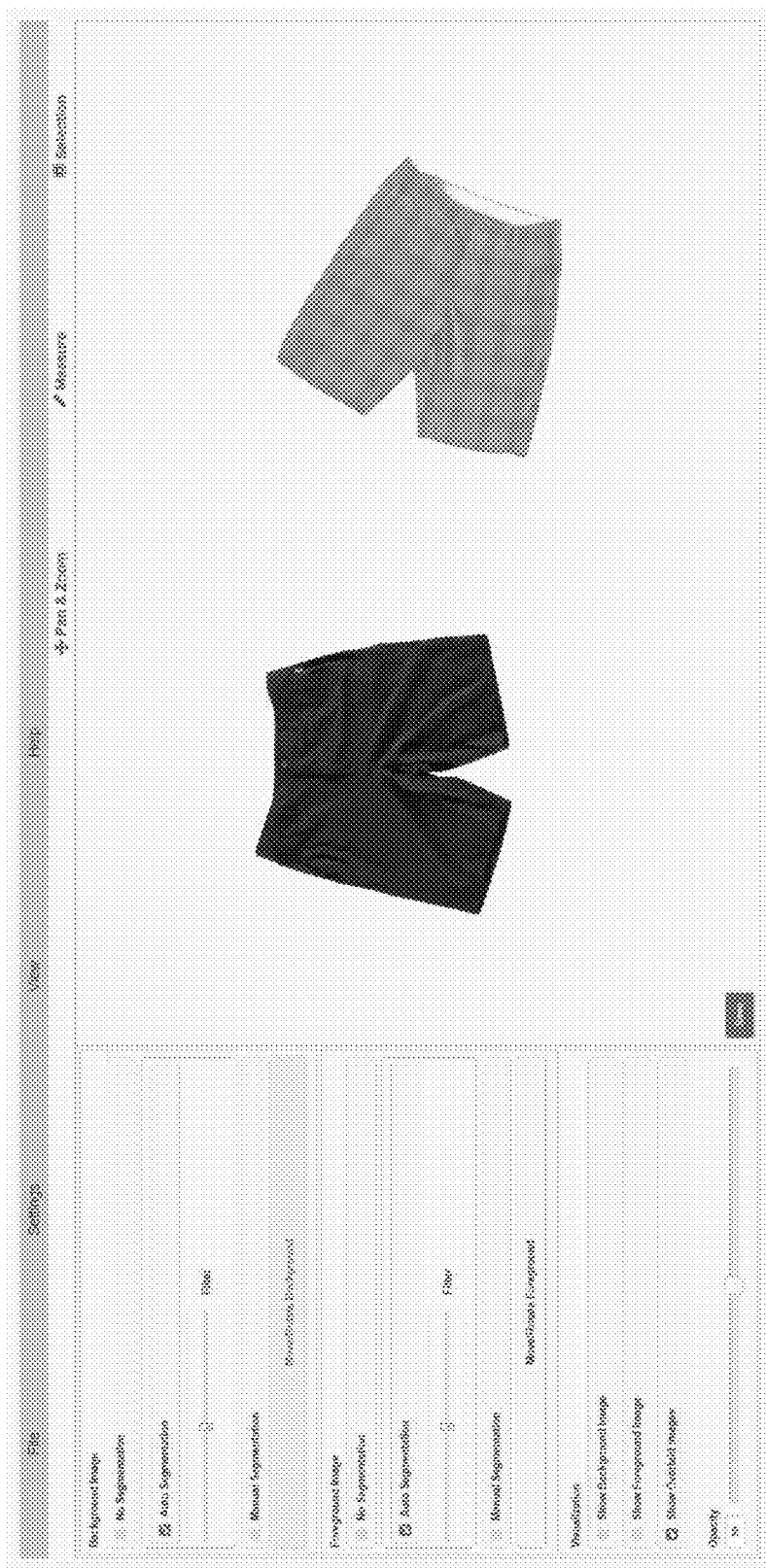
FIG. 27 is a screenshot of a GUI illustrating two segmented images of two articles of clothing at the beginning of an overlay process, according to one embodiment of the disclosure.
Figure 28:
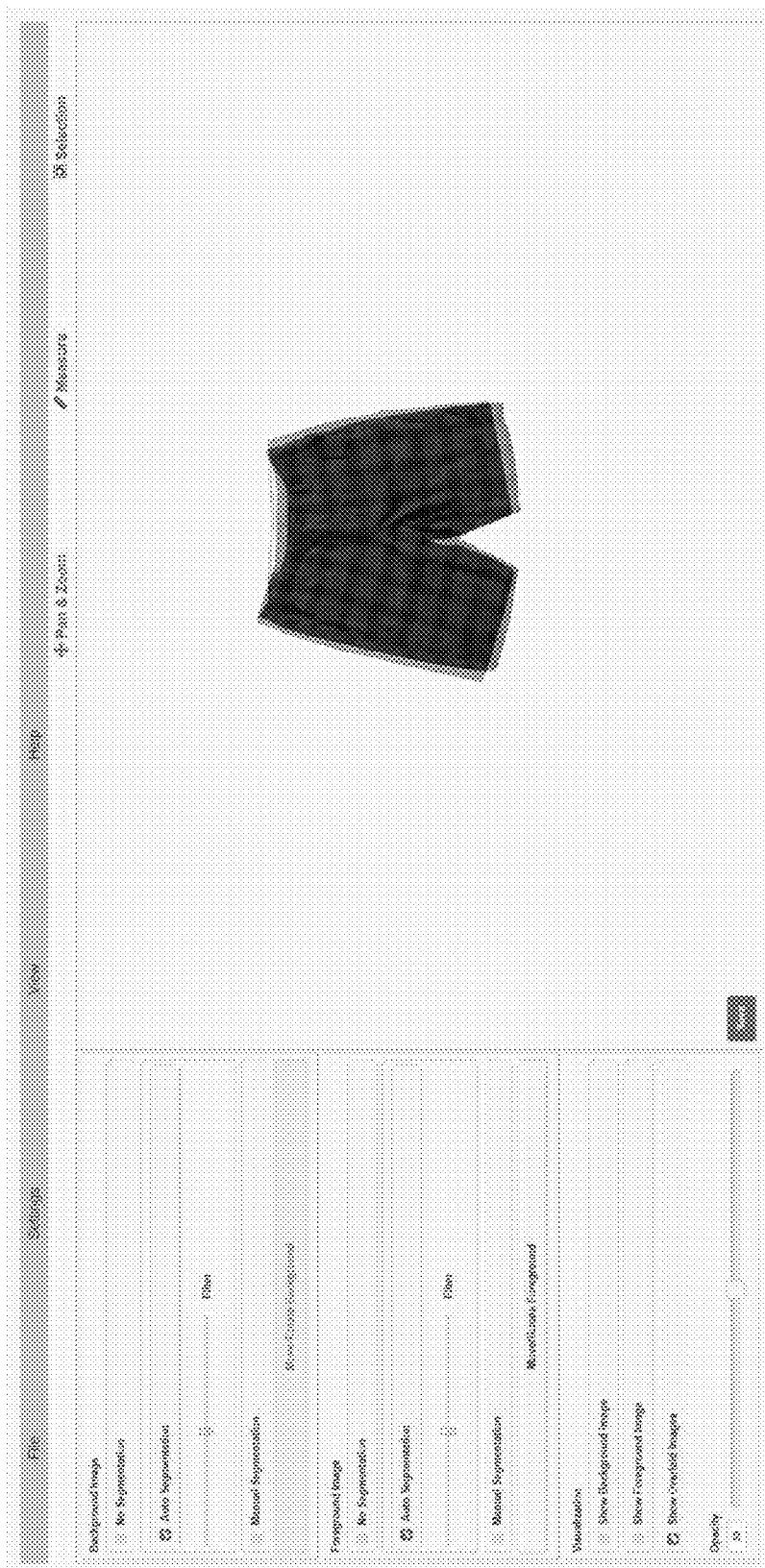
FIG. 28 is a screenshot of a GUI illustrating the two segmented images of the two articles of clothing at the end of the overlay process, according to one embodiment of the disclosure.

FIG. 27 is a screenshot of a GUI illustrating two segmented images of two articles of clothing at the beginning of an overlay process and FIG. 28 is a screenshot of a GUI illustrating the two segmented images of the two articles of clothing at the end of the overlay process overlaid on top of each other.

Figure 29:
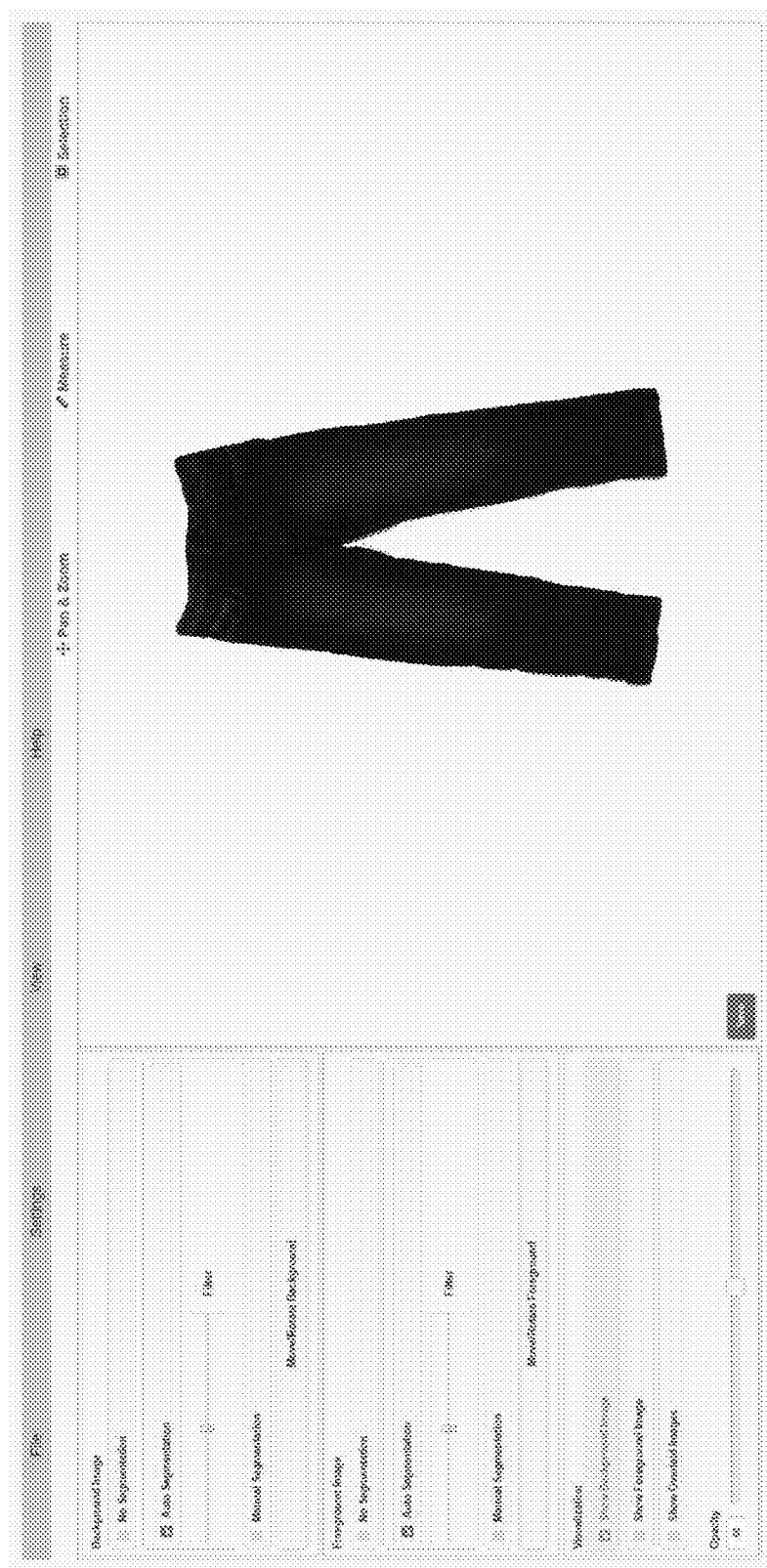
FIG. 29 is a screenshot of a GUI illustrating a background image of a first article of clothing, according to one embodiment of the disclosure.
Figure 30:
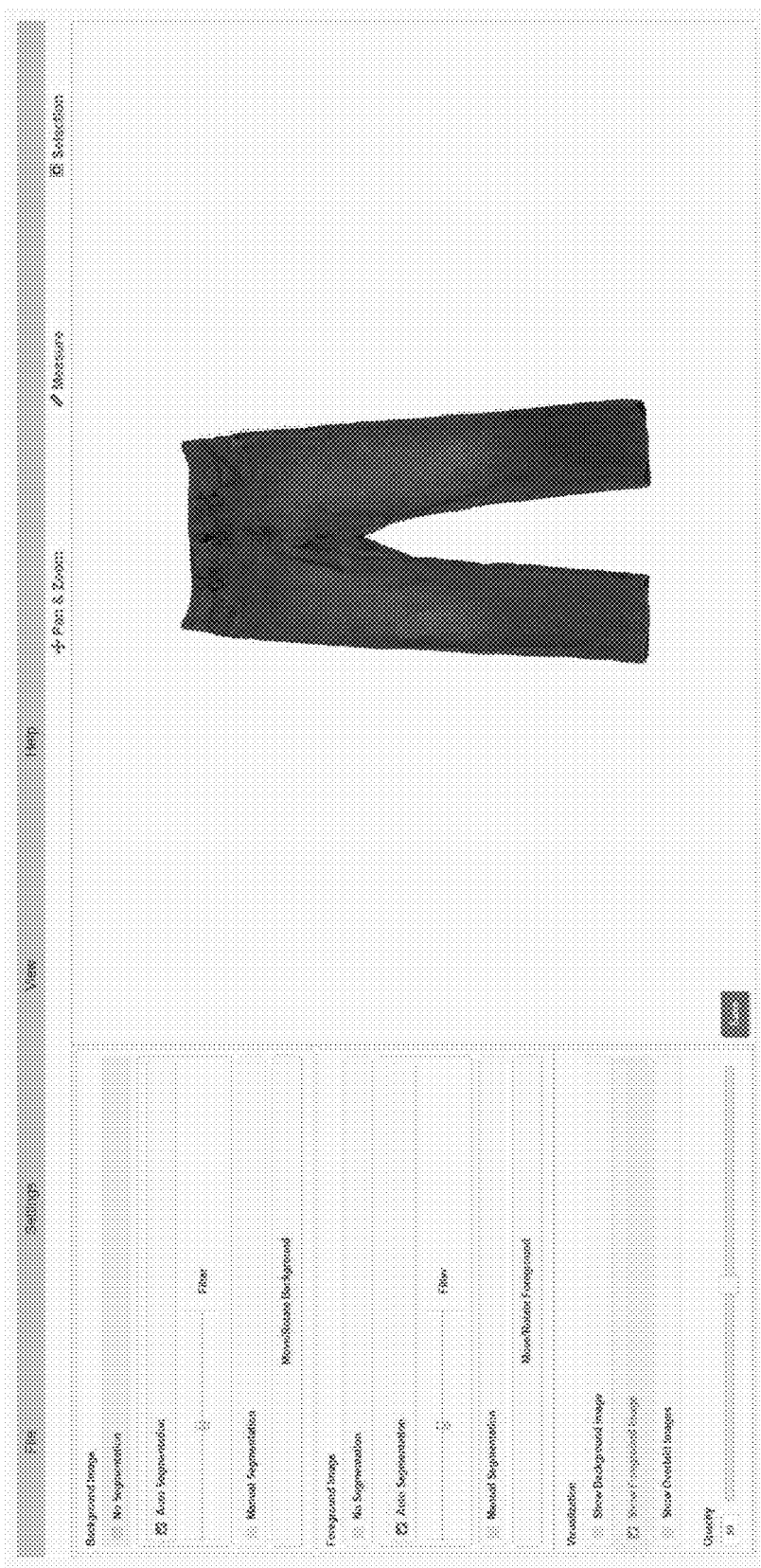
FIG. 30 is a screenshot of a GUI illustrating a foreground image of a second article of clothing, according to one embodiment of the disclosure.
Figure 31:
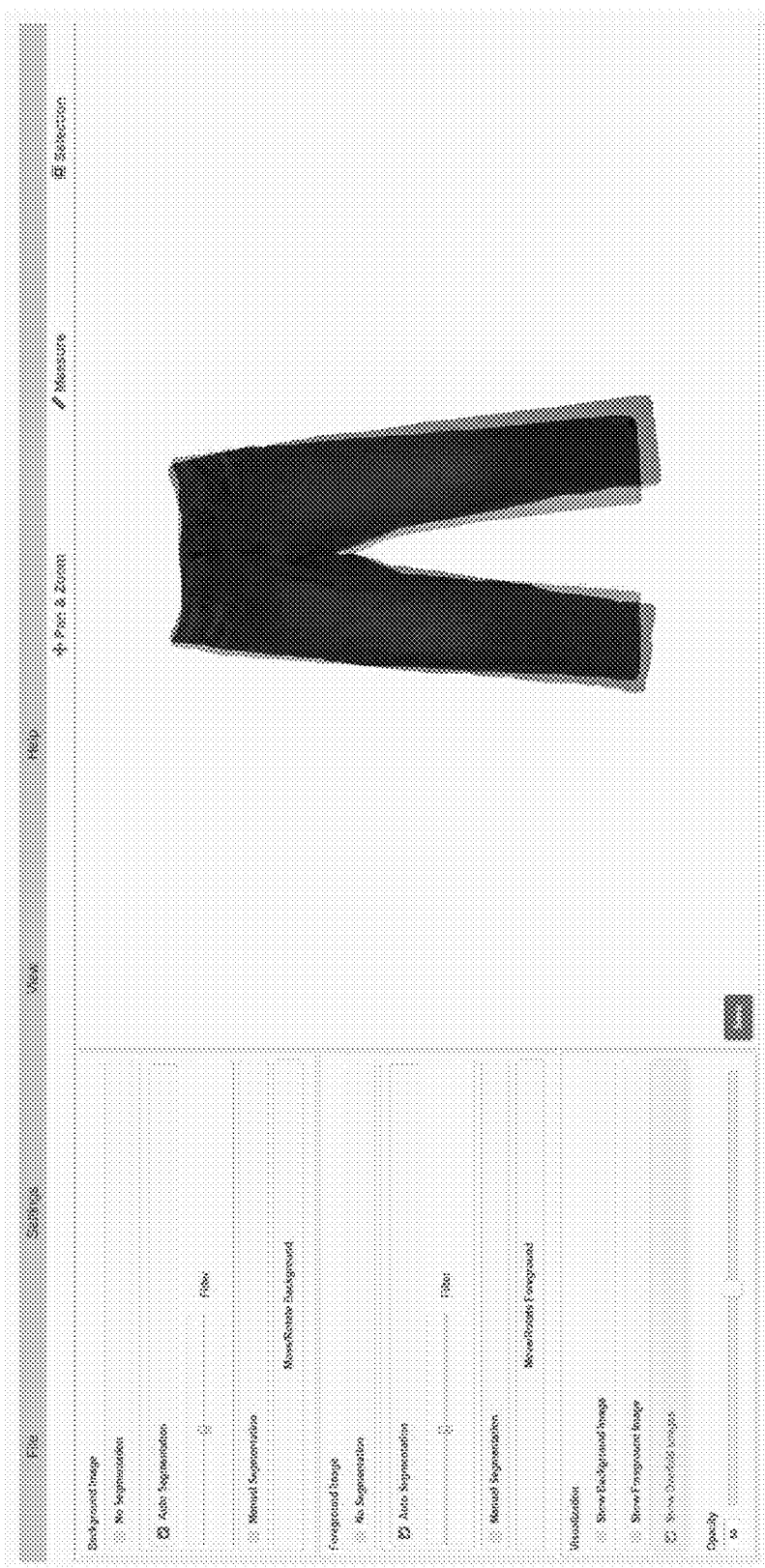
FIG. 31 is a screenshot of a GUI illustrating the background image of the first article of clothing of FIG. 29 overlaid with the foreground image of the second article of clothing of FIG. 30, according to one embodiment of the disclosure.
Figure 32:
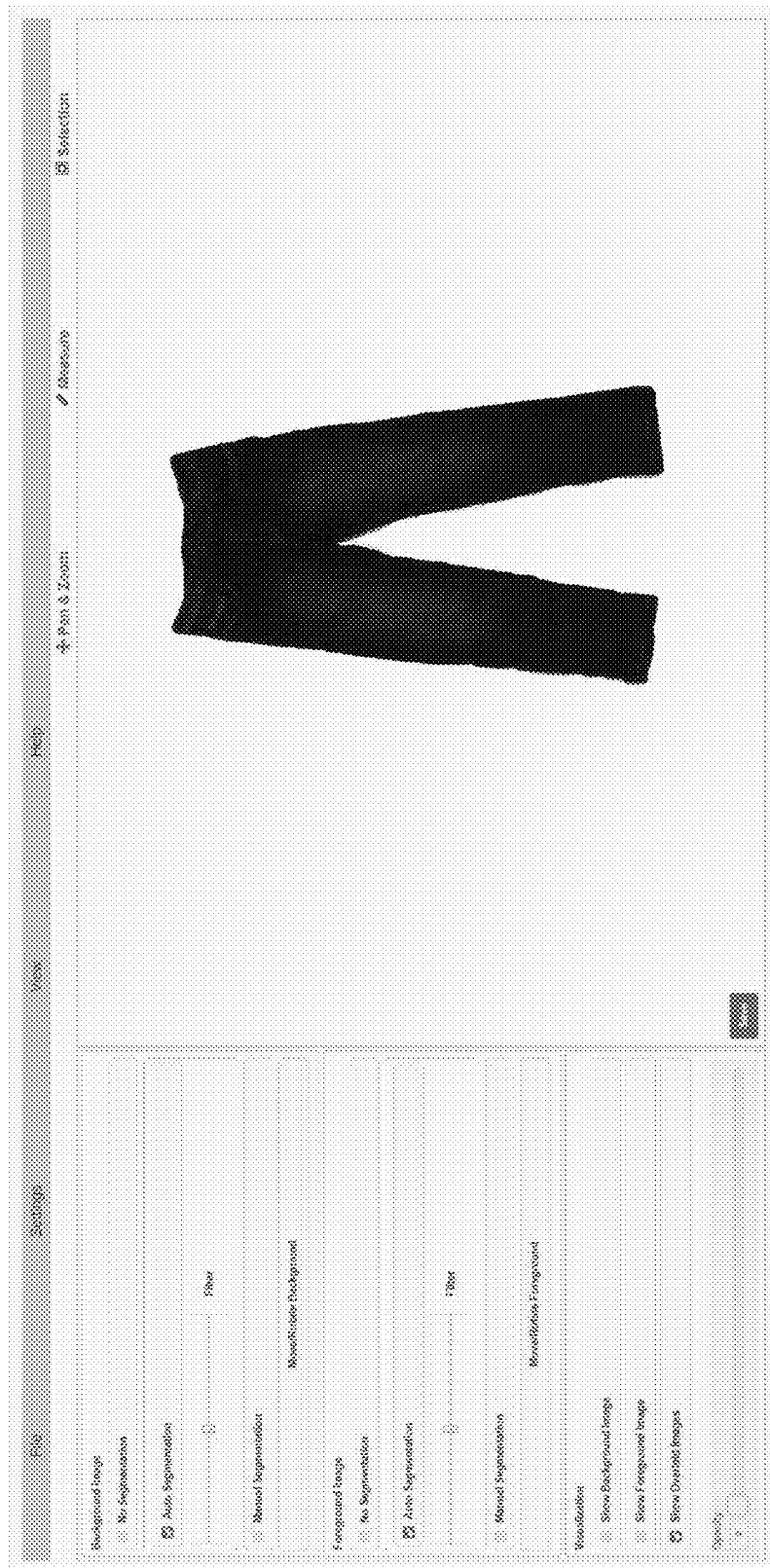
FIG. 32 is a screenshot of a GUI illustrating the overlaid images of FIG. 31 with opacity set to 0, such that 100% of the background image of the first article of clothing is displayed and 0% of the foreground image of the second article of clothing is displayed, according to one embodiment of the disclosure.
Figure 33:
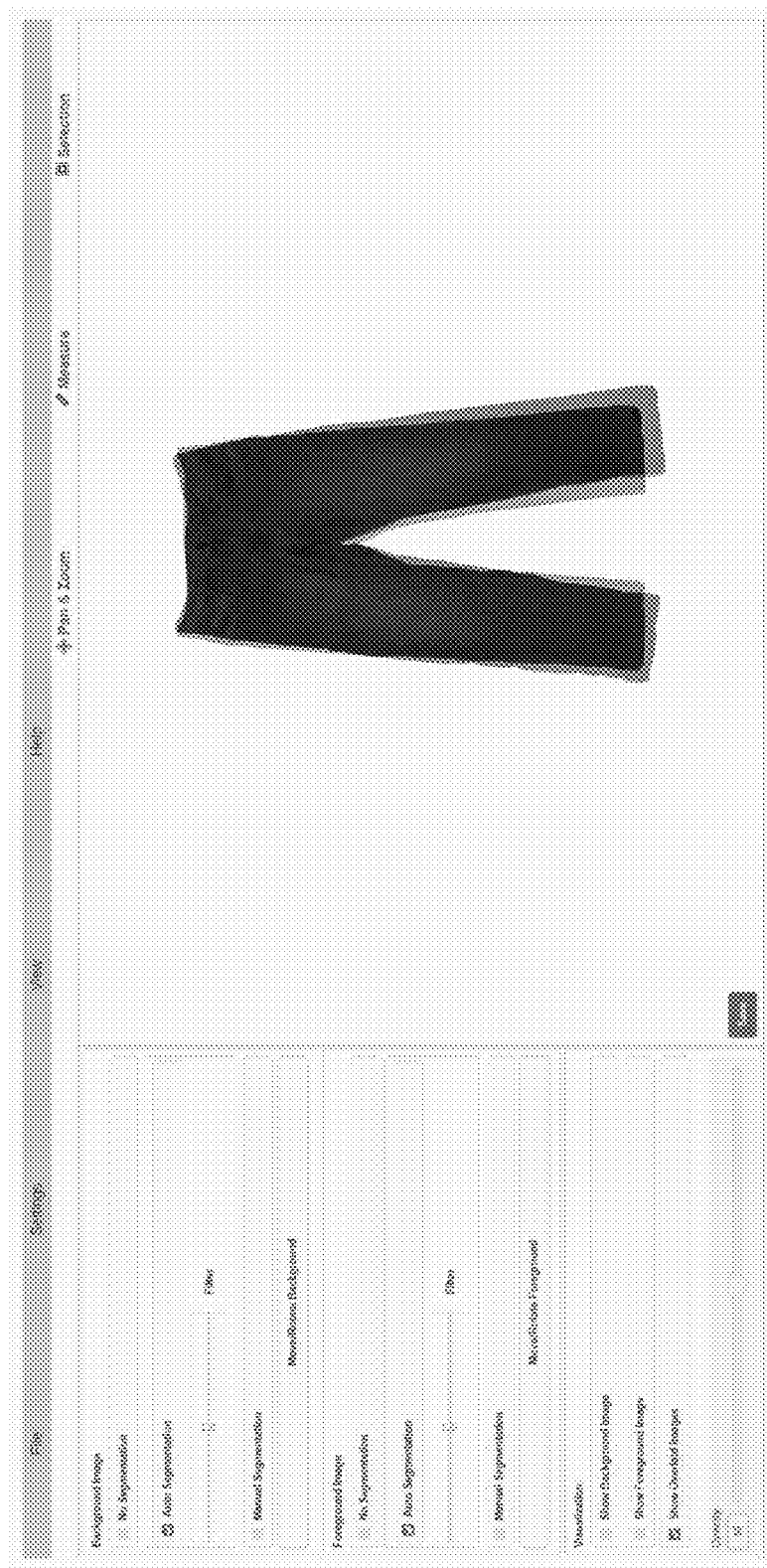
FIG. 33 is a screenshot of a GUI illustrating the overlaid images of FIG. 31 with opacity set to 50, such that 50% of the background image of the first article of clothing is displayed and 50% of the foreground image of the second article of clothing is displayed, according to one embodiment of the disclosure.
Figure 34:
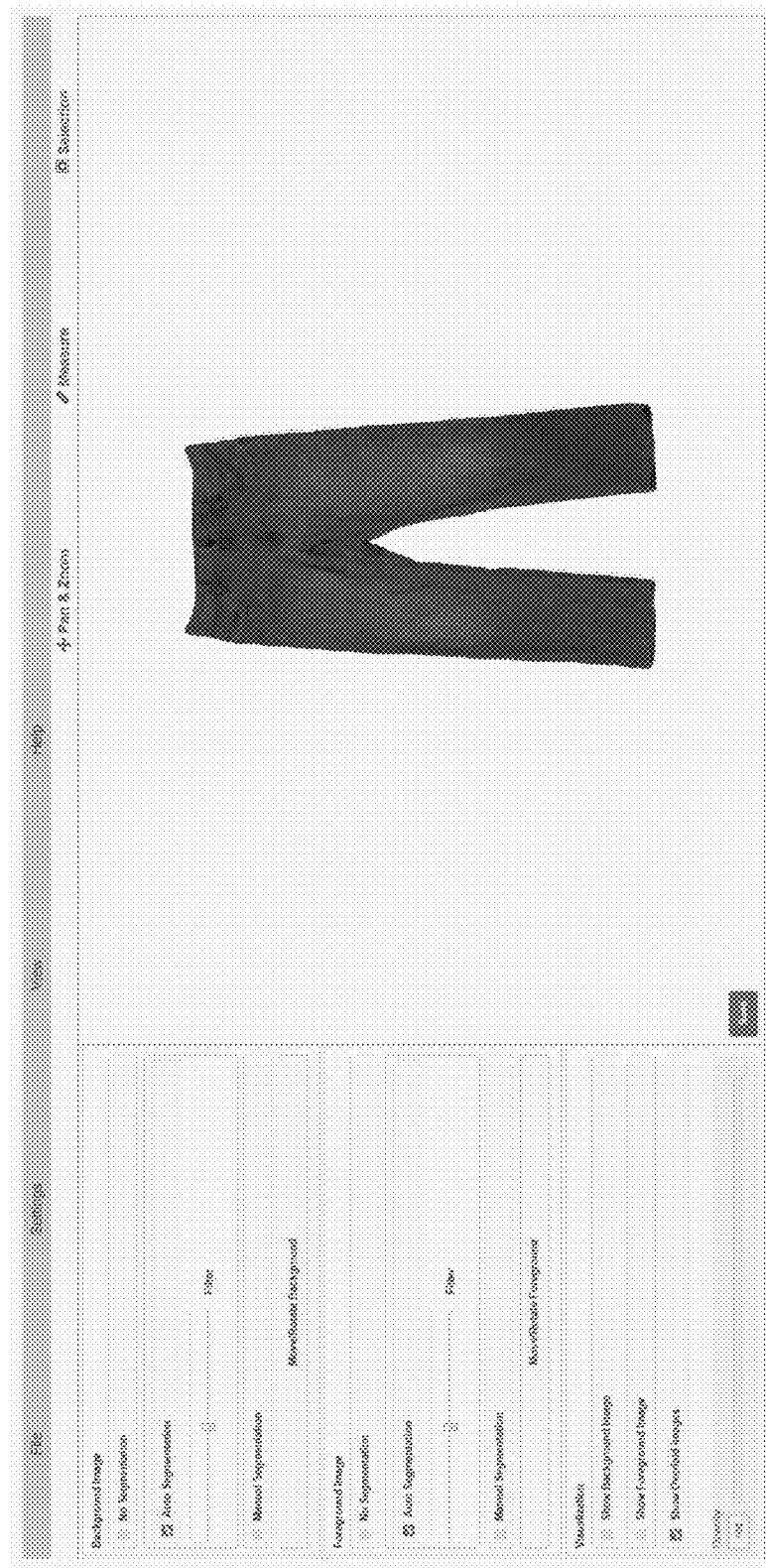
FIG. 34 is a screenshot of a GUI illustrating the overlaid images of FIG. 31 with opacity set to 100, such that 0% of the background image of the first article of clothing is displayed and 100% of the foreground image of the second article of clothing is displayed, according to one embodiment of the disclosure.
Figure 35:
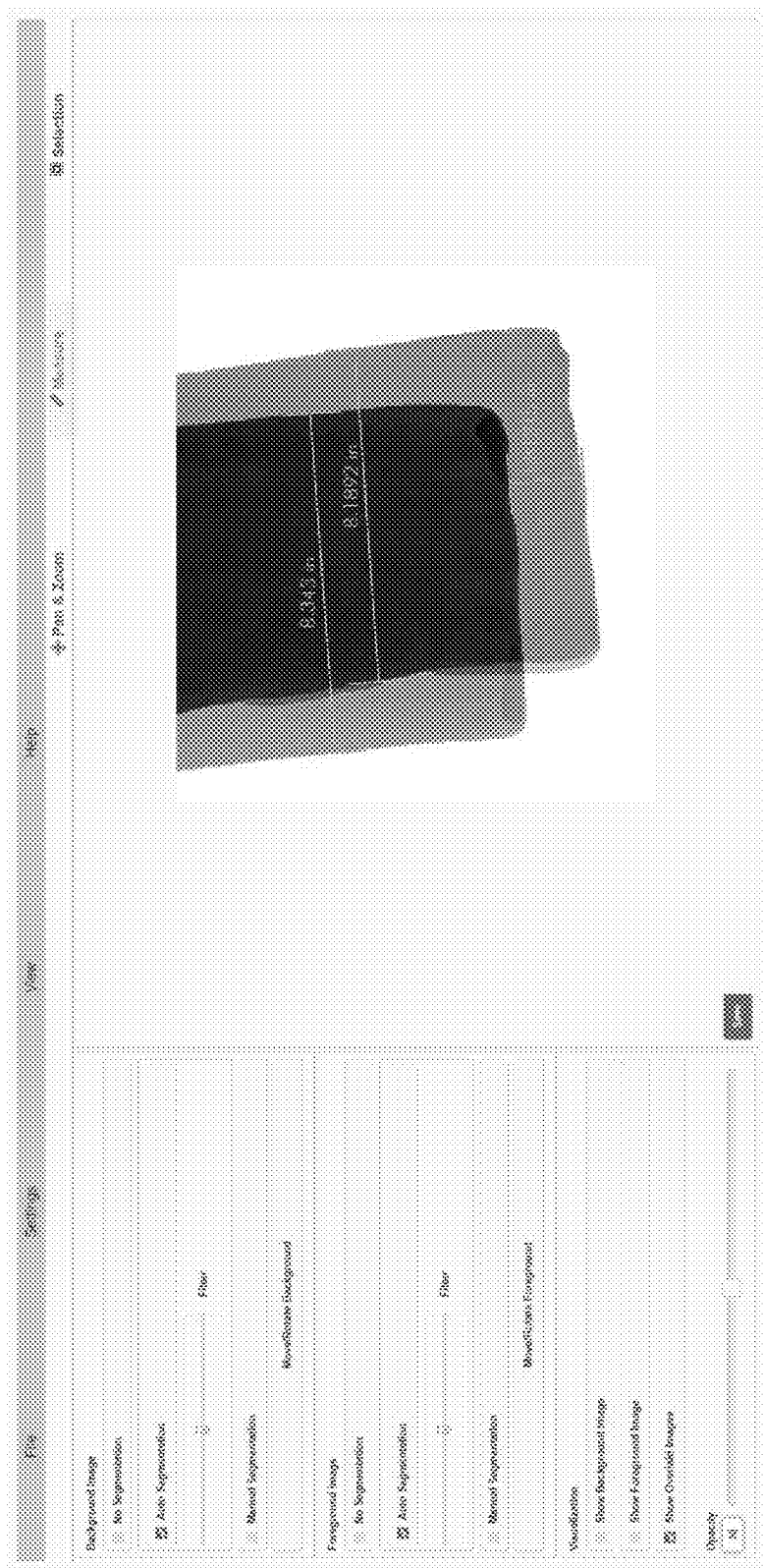
FIG. 35 is a screenshot of a GUI illustrating a zoomed-in portion of the overlaid images of FIG. 31 with opacity set to 50, as well as multiple measurement markers relative to the two items of clothing, according to one embodiment of the disclosure.

FIG. 29 is a screenshot of a GUI illustrating a background image of a first article of clothing; FIG. 30 is a screenshot of a GUI illustrating a foreground image of a second article of clothing; FIG. 31 is a screenshot of a GUI illustrating the background image of the first article of clothing of FIG. 29 overlaid with the foreground image of the second article of clothing of FIG. 30; FIG. 32 is a screenshot of a GUI illustrating the overlaid images of FIG. 31 with opacity set to 0, such that 100% of the background image of the first article of clothing is displayed and 0% of the foreground image of the second article of clothing is displayed; FIG. 33 is a screenshot of a GUI illustrating the overlaid images of FIG. 31 with opacity set to 50, such that 50% of the background image of the first article of clothing is displayed and 50% of the foreground image of the second article of clothing is displayed; FIG. 34 is a screenshot of a GUI illustrating the overlaid images of FIG. 31 with opacity set to 100, such that 0% of the background image of the first article of clothing is displayed and 100% of the foreground image of the second article of clothing is displayed, according to one embodiment of the disclosure; and FIG. 35 is a screenshot of a GUI illustrating a zoomed-in portion of the overlaid images of FIG. 31 with opacity set to 50, as well as showing multiple measurement markers made by the user on the overlaid images to measure various aspects of the two items of clothing. Output images may be saved to allow the user to quickly load an image when shopping online. Output images can be saved at any stage (e.g., overlaid images) and may also save any annotations present in the image (e.g., see FIG. 35).

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, Figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

The word "exemplary" is used herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Recitation in the claims of the term "first" with respect to a feature or element does not necessarily imply the existence of a second or additional such feature or element. Elements recited in means-plus-function format are intended to be construed in accordance with 35 U.S.C. § 112 Para. 6. It will be apparent to those having skill in the art that changes may be made to the details of the above-described embodiments without departing from the underlying principles of the disclosure.

The phrases "connected to," "coupled to" and "in communication with" refer to any form of interaction between two or more entities, including mechanical, electrical, magnetic, electromagnetic, fluid, and thermal interaction. Two components may be functionally coupled to each other even though they are not in direct contact with each other. The term "abutting" refers to items that are in direct physical contact with each other, although the items may not necessarily be attached together. The phrase "fluid communication" refers to two features that are connected such that a fluid within one feature is able to pass into the other feature.

While specific embodiments and applications of the present disclosure have been illustrated and described, it is to be understood that the disclosure is not limited to the precise configuration and components disclosed herein. Various modifications, changes, and variations which will be apparent to those skilled in the art may be made in the arrangement, operation, and details of the methods and systems of the present disclosure disclosed herein without departing from the spirit and scope of the disclosure.

What is claimed is:

1. A system for comparing one or more relative size differences between two objects, the system comprising:
   a display;
   a processor configured to:
   receive a first image comprising a first angled-view of a first object arbitrarily spaced apart from one or more first reference markers;
   receive a second image comprising a second object; and
   receive reference marker definition data comprising size, shape, and/or location information for the one or more first reference markers;
   a top-view space component communicatively coupled to the processor and configured to calculate a first top-view space for the first image based on the reference marker definition data;
   an image rectification component communicatively coupled to the processor and configured to rectify the first image by transforming the first angled-view of the first image to a rectified first top-view of the first image based on a first set of correspondences between the one or more first reference markers in the first image and the first top-view space of the first image; and an overlay component communicatively coupled to the processor and the display, the overlay component configured to overlay the rectified first top-view of the first image with the second image on the display to enable comparison of one or more relative size differences between the first object and the second object;

wherein the rectified first top-view of the first image comprises a photograph or a processed version of the photograph.

2. The system of claim 1, wherein:
the second image further comprises a second angled-view of the second object spaced apart from one or more second reference markers;
the reference marker definition data further comprises size, shape, and location information for the one or more second reference markers;
the top-view space component is further configured to calculate a second top-view space for the second image based on the reference marker definition data;
the image rectification component is further configured to rectify the second image by transforming the second angled-view of the second image to a rectified second top-view of the second image based on a second set of correspondences between the one or more second reference markers in the second image and the second top-view space of the second image; and
the overlay component is further configured to overlay the rectified first top-view of the first image with the rectified second top-view of the second image on the display to enable comparison of one or more relative size differences between the first object and the second object.

3. The system of claim 2, wherein the image rectification component is further configured to scale the rectified first top-view of the first image with the rectified second top-view of the second image to matching scales, based on the one or more first reference markers and the one or more second reference markers, such that accurate measurements may be taken between the first object and the second object.

4. The system of claim 3, further comprising an image segmentation component communicatively coupled to the processor and configured to segment the first object from a background of the rectified first top-view of the first image and segment the second object from a background of the rectified second top-view of the second image to facilitate comparison of the one or more relative size differences between the first object and the second object.

5. The system of claim 1, wherein the one or more first reference markers comprises one or more ArUco markers.

6. The system of claim 5, wherein the one or more ArUco markers are spaced along outer edges of a single reference board, such that the one or more ArUco markers surround and define an interior space of the single reference board, the interior space comprising a substantially monochrome colored background, wherein the first object in the first image is placed on the interior space of the single reference board such that the first object is surrounded by the one or more ArUco markers.

7. The system of claim 6, wherein the single reference board is reversible and comprises a light colored background on a first side of the single reference board and a dark colored background on a second side of the single reference board, the single reference board further comprising at least one color chart to enable color comparisons between the first object and the second object, and wherein the single reference board is made of materials selected from at least one: silicone, cloth, paper, and plastic.

8. The system of claim 5, wherein the one or more ArUco markers are printed on one or more standard sized sheets of printer paper and arranged around the first object in the first image.

9. A method for comparing one or more relative size differences between two objects, the method comprising:
at one or more processors associated with an image rectification component, a top-view space component, an overlay component, and a display:
receiving a first image comprising a first angled-view of a first object spaced apart from one or more first reference markers such that the first object has at least one of an arbitrary size, an arbitrary shape, and an arbitrary location relative to the one or more first reference markers;
receiving a second image comprising a second object;
receiving reference marker definition data comprising size, shape, and/or location information for the one or more first reference markers;
calculating a first top-view space for the first image based on the reference marker definition data;
rectifying the first image by transforming the first angled-view of the first image to a rectified first top-view of the first image based on a first set of correspondences between the one or more first reference markers in the first image and the first top-view space of the first image; and
overlaying the rectified first top-view of the first image with the second image on the display to enable comparison of one or more relative size differences between the first object and the second object;
wherein the rectified first top-view of the first image comprises a photograph or a processed version of the photograph.

10. The method of claim 9, wherein:
the second image further comprises a second angled-view of the second object spaced apart from one or more second reference markers;
the reference marker definition data further comprises size, shape, and location information for the one or more second reference markers;
and wherein the method further comprises:
calculating a second top-view space for the second image based on the reference marker definition data;
rectifying the second image by transforming the second angled-view of the second image to a rectified second top-view of the second image based on a second set of correspondences between the one or more second reference markers in the second image and the second top-view space of the second image; and
overlaying the rectified first top-view of the first image with the rectified second top-view of the second image on the display to enable comparison of one or more relative size differences between the first object and the second object.

11. The method of claim 10, further comprising scaling the rectified first top-view of the first image with the rectified second top-view of the second image to matching scales, based on the one or more first reference markers and the one or more second reference markers, such that accurate measurements may be taken between the first object and the second object.

12. The method of claim 11, further comprising segmenting the first object from a background of the rectified first top-view of the first image and segmenting the second object from a background of the rectified second top-view of the second image to facilitate comparison of the one or more relative size differences between the first object and the second object.

13. The method of claim 9, wherein the one or more first reference markers comprises one or more ArUco markers.

14. The method of claim 13, wherein the one or more ArUco markers are spaced along outer edges of a single reference board, such that the one or more ArUco markers surround and define an interior space on the single reference board, the interior space comprising a substantially monochrome colored background, wherein the first object in the first image is placed on the interior space of the single reference board such that the first object is surrounded by the one or more ArUco markers.

15. The method of claim 14, wherein the single reference board is reversible and comprises a light colored background on a first side of the single reference board and a dark colored background on a second side of the single reference board, the single reference board further comprising at least one color chart to enable color comparisons between the first object and the second object, and wherein the single reference board is made of materials selected from at least one: silicone, cloth, paper, and plastic.

16. The method of claim 13, wherein the one or more ArUco markers are printed on one or more standard sized sheets of printer paper and arranged around the first object in the first image.

17. A computer program product for comparing one or more relative size differences between two objects, the computer program product comprising:
   a non-transitory storage medium; and
   computer program code, encoded on the non-transitory storage medium, wherein the computer program code is configured to cause at least one processor to perform the steps of:
      receiving a first image comprising a first angled-view of a first object spaced apart from one or more first reference markers such that the first object has at least one of an arbitrary size, an arbitrary shape, and an arbitrary location relative to the one or more first reference markers;
      receiving a second image comprising a second object;
      receiving reference marker definition data comprising size, shape, and/or location information for the one or more first reference markers;
      calculating a first top-view space for the first image based on the reference marker definition data;
      rectifying the first image by transforming the first angled-view of the first image to a rectified first top-view of the first image based on a first set of correspondences between the one or more first reference markers in the first image and the first top-view space of the first image; and
      overlaying the rectified first top-view of the first image with the second image on a display to enable comparison of one or more relative size differences between the first object and the second object;
      wherein the rectified first top-view of the first image comprises a photograph or a processed version of the photograph.

18. The computer program product of claim 17, wherein:
the second image further comprises a second angled-view of the second object spaced apart from one or more second reference markers;
the reference marker definition data further comprises size, shape, and location information for the one or more second reference markers;
and wherein the computer program code is further configured to cause the at least one processor to perform the steps of:
   calculating a second top-view space for the second image based on the reference marker definition data;
   rectifying the second image by transforming the second angled-view of the second image to a rectified second top-view of the second image based on a second set of correspondences between the one or more second reference markers in the second image and the second top-view space of the second image; and
   overlaying the rectified first top-view of the first image with the rectified second top-view of the second image on the display to enable comparison of one or more relative size differences between the first object and the second object.

19. The computer program product of claim 18, wherein the computer program code is further configured to cause the at least one processor to perform the step of scaling the rectified first top-view of the first image with the rectified second top-view of the second image to matching scales, based on the one or more first reference markers and the one or more second reference markers, such that accurate measurements may be taken between the first object and the second object.

20. The computer program product of claim 19, wherein the computer program code is further configured to cause the at least one processor to perform the step of segmenting the first object from a background of the rectified first top-view of the first image and segmenting the second object from a background of the rectified second top-view of the second image to facilitate comparison of the one or more relative size differences between the first object and the second object.

* * * * *